(12) United States Patent
Warner et al.

(10) Patent No.: US 10,776,830 B2
(45) Date of Patent: Sep. 15, 2020

(54) METHODS AND SYSTEMS FOR IDENTIFYING NEW COMPUTERS AND PROVIDING MATCHING SERVICES

(71) Applicant: Google Inc., Mountain View, CA (US)

(72) Inventors: Craig Warner, Palo Alto, CA (US); Timothy O'Connor, Moraga, CA (US); Alexander Ross, San Jose, CA (US); Gaurav Bhaya, Sunnyvale, CA (US); Robert Stets, Mountain View, CA (US)

(73) Assignee: Google LLC, Mountain View, CA (US)

( * ) Notice: Subject to any disclaimer, the term of this patent is extended or adjusted under 35 U.S.C. 154(b) by 512 days.

(21) Appl. No.: 15/638,298

(22) Filed: Jun. 29, 2017

(65) Prior Publication Data

US 2017/0300977 A1 Oct. 19, 2017

Related U.S. Application Data

(63) Continuation of application No. 15/395,703, filed on Dec. 30, 2016, now Pat. No. 10,032,452, and a continuation of application No. 13/478,998, filed on May 23, 2012, now Pat. No. 10,152,723.

(51) Int. Cl.
*G06Q 30/02* (2012.01)
*G06F 16/48* (2019.01)
*G06F 15/16* (2006.01)

(52) U.S. Cl.
CPC ....... *G06Q 30/0271* (2013.01); *G06F 16/489* (2019.01); *G06F 15/16* (2013.01)

(58) Field of Classification Search
CPC .... G06Q 30/0271; G06F 16/489; G06F 15/16
See application file for complete search history.

(56) References Cited

U.S. PATENT DOCUMENTS

| 5,675,788 A | 10/1997 | Husick et al. |
| 5,724,521 A | 3/1998 | Dedrick |
| 5,740,549 A | 4/1998 | Reilly et al. |

(Continued)

FOREIGN PATENT DOCUMENTS

| EP | 1 271 458 | 1/2003 |
| EP | 1 286 288 | 2/2003 |

(Continued)

OTHER PUBLICATIONS

Xuan Feng, Qiang Li, Qi Han, Hongsong Zhu, Yan Liu, Jie Cui, Limin Sun; Active Profiling of Physical Devices at Internet Scale (2016) IEEE (Year: 2016).*

(Continued)

*Primary Examiner* — Sam Refai
*Assistant Examiner* — Rashida R Shorter
(74) *Attorney, Agent, or Firm* — Foley & Lardner LLP; James De Vellis

(57) ABSTRACT

A method of providing services to computing devices includes establishing a connection over the Internet with a computing device; receiving data from the computing device during the connection; extracting a signal from the data received from the computing device; estimating a relative age of the computing device based on the extracted signal; selecting a service from a plurality of services based on the estimated relative age of the computing device; and providing the selected service to the computing device.

20 Claims, 7 Drawing Sheets

(56) References Cited

U.S. PATENT DOCUMENTS

| | | |
|---|---|---|
| 5,749,069 A | 5/1998 | Komori et al. |
| 5,848,397 A | 12/1998 | Marsh et al. |
| 5,850,433 A | 12/1998 | Rondeau |
| 5,930,773 A | 7/1999 | Crooks et al. |
| 5,948,061 A | 9/1999 | Merriman et al. |
| 6,026,368 A | 2/2000 | Brown et al. |
| 6,044,376 A | 3/2000 | Kurtzman, II |
| 6,078,914 A | 6/2000 | Redfern |
| 6,088,688 A | 7/2000 | Crooks et al. |
| 6,125,284 A | 9/2000 | Moore et al. |
| 6,144,944 A | 11/2000 | Kurtzman et al. |
| 6,167,382 A | 12/2000 | Sparks et al. |
| 6,189,003 B1 | 2/2001 | Leal |
| 6,259,127 B1 | 7/2001 | Pan |
| 6,259,405 B1 | 7/2001 | Stewart et al. |
| 6,269,361 B1 | 7/2001 | Davis et al. |
| 6,275,806 B1 | 8/2001 | Pertrushin |
| 6,332,127 B1 | 12/2001 | Bandera et al. |
| 6,401,075 B1 | 6/2002 | Mason et al. |
| 6,446,045 B1 | 9/2002 | Stone et al. |
| 6,600,930 B1 | 7/2003 | Sakurai et al. |
| 6,647,257 B2 | 11/2003 | Owensby |
| 6,665,293 B2 | 12/2003 | Thornton et al. |
| 6,677,894 B2 | 1/2004 | Sheynblat et al. |
| 6,684,249 B1 | 1/2004 | Frerichs et al. |
| 6,731,612 B1 | 5/2004 | Koss |
| 6,857,007 B1 | 2/2005 | Bloomfield |
| 6,956,816 B1 | 10/2005 | Alexander et al. |
| 6,983,331 B1 | 1/2006 | Mitchell et al. |
| 6,985,882 B1 | 1/2006 | Del Sesto |
| 7,016,343 B1 | 3/2006 | Mermel et al. |
| 7,039,599 B2 | 5/2006 | Merriman et al. |
| 7,120,235 B2 | 10/2006 | Altberg et al. |
| 7,136,875 B2 | 11/2006 | Anderson et al. |
| 7,240,025 B2 | 7/2007 | Stone et al. |
| 7,376,640 B1 | 5/2008 | Anderson et al. |
| 7,406,434 B1 | 7/2008 | Chang et al. |
| 7,613,637 B2 | 11/2009 | Chan et al. |
| 7,668,950 B2 | 2/2010 | Horowitz et al. |
| 7,853,255 B2 | 12/2010 | Karaoguz et al. |
| 7,881,936 B2 | 2/2011 | Longe et al. |
| 7,904,460 B2 | 3/2011 | Armour et al. |
| 7,920,682 B2 | 4/2011 | Byrne et al. |
| 8,041,709 B2 | 10/2011 | Permandala et al. |
| 8,068,604 B2 | 11/2011 | Leeds et al. |
| 8,108,383 B2 | 1/2012 | Lin et al. |
| 8,175,914 B1 | 5/2012 | Benson et al. |
| 8,195,133 B2 | 6/2012 | Ramer et al. |
| 8,204,881 B2 | 6/2012 | Holt et al. |
| 8,214,342 B2 | 7/2012 | Meiresonne |
| 8,234,275 B2 | 7/2012 | Grant et al. |
| 8,312,014 B2 | 11/2012 | Lu et al. |
| 8,326,637 B2 | 12/2012 | Baldwin et al. |
| 8,386,386 B1 | 2/2013 | Zhu |
| 8,453,058 B1 | 5/2013 | Coccaro et al. |
| 8,612,226 B1 | 12/2013 | Epstein et al. |
| 8,762,156 B2 | 6/2014 | Chen |
| 8,903,716 B2 | 12/2014 | Chen et al. |
| 9,275,637 B1 | 3/2016 | Salvador et al. |
| 9,318,107 B1 | 4/2016 | Sharifi |
| 9,424,841 B2 | 8/2016 | Foerster et al. |
| 9,431,006 B2 | 8/2016 | Bellegarda |
| 9,542,941 B1 | 1/2017 | Weksler et al. |
| 9,653,075 B1 | 5/2017 | Chen et al. |
| 10,032,452 B1 | 7/2018 | Bhaya et al. |
| 10,165,091 B1 | 12/2018 | Bittfield et al. |
| 10,193,465 B2 | 1/2019 | Dai et al. |
| 10,535,348 B2 | 1/2020 | Bhaya et al. |
| 2001/0020236 A1 | 9/2001 | Cannon |
| 2001/0025275 A1 | 9/2001 | Tanaka et al. |
| 2002/0029226 A1 | 3/2002 | Li et al. |
| 2002/0042829 A1 | 4/2002 | Mizuhara et al. |
| 2002/0077130 A1 | 6/2002 | Owensby |
| 2002/0082938 A1 | 6/2002 | Borger et al. |
| 2002/0091571 A1 | 7/2002 | Thomas et al. |
| 2002/0128908 A1 | 9/2002 | Levin et al. |
| 2002/0161646 A1 | 10/2002 | Gailey et al. |
| 2002/0164977 A1 | 11/2002 | Link, II et al. |
| 2002/0188680 A1 | 12/2002 | McCormack et al. |
| 2003/0008661 A1 | 1/2003 | Joyce et al. |
| 2003/0018479 A1 | 1/2003 | Oh et al. |
| 2003/0028529 A1 | 2/2003 | Cheung et al. |
| 2003/0032406 A1 | 2/2003 | Minear et al. |
| 2003/0032409 A1 | 2/2003 | Hutcheson et al. |
| 2003/0033079 A1 | 2/2003 | Endicott |
| 2003/0033292 A1 | 2/2003 | Meisel et al. |
| 2003/0046161 A1 | 3/2003 | Kamangar et al. |
| 2003/0061211 A1 | 3/2003 | Shultz et al. |
| 2003/0105677 A1 | 6/2003 | Skinner |
| 2003/0125977 A1 | 7/2003 | Morioka et al. |
| 2003/0154072 A1 | 8/2003 | Young et al. |
| 2003/0220835 A1 | 11/2003 | Barnes, Jr. |
| 2004/0023666 A1 | 2/2004 | Moon et al. |
| 2004/0030556 A1 | 2/2004 | Bennett |
| 2004/0043770 A1 | 3/2004 | Amit et al. |
| 2004/0044565 A1 | 3/2004 | Kumar et al. |
| 2004/0044571 A1 | 3/2004 | Bronnimann et al. |
| 2004/0059712 A1 | 3/2004 | Dean et al. |
| 2004/0076279 A1 | 4/2004 | Taschereau |
| 2004/0083133 A1 | 4/2004 | Nicholas et al. |
| 2004/0085894 A1 | 5/2004 | Wang et al. |
| 2004/0120323 A1 | 6/2004 | Viikari et al. |
| 2004/0172389 A1 | 9/2004 | Galai et al. |
| 2004/0220778 A1 | 11/2004 | Imai et al. |
| 2005/0027659 A1 | 2/2005 | Kumar et al. |
| 2005/0065999 A1 | 3/2005 | Acharya et al. |
| 2005/0074102 A1 | 4/2005 | Altberg et al. |
| 2005/0076017 A1 | 4/2005 | Rein et al. |
| 2005/0086104 A1 | 4/2005 | McFadden |
| 2005/0097204 A1 | 5/2005 | Horowitz et al. |
| 2005/0137939 A1 | 6/2005 | Calabria et al. |
| 2005/0144065 A1 | 6/2005 | Calabria et al. |
| 2005/0144069 A1 | 6/2005 | Wiseman et al. |
| 2005/0187823 A1 | 8/2005 | Howes |
| 2005/0225810 A1 | 10/2005 | Sun |
| 2005/0234879 A1 | 10/2005 | Zeng et al. |
| 2006/0004627 A1 | 1/2006 | Baluja |
| 2006/0149624 A1 | 7/2006 | Baluja et al. |
| 2006/0190974 A1 | 8/2006 | Lee |
| 2006/0195819 A1 | 8/2006 | Chory et al. |
| 2006/0247913 A1 | 11/2006 | Huerta et al. |
| 2006/0274869 A1 | 12/2006 | Morse |
| 2006/0287919 A1 | 12/2006 | Rubens et al. |
| 2007/0005570 A1 | 1/2007 | Hurst-Hiller et al. |
| 2007/0088609 A1 | 4/2007 | Reller et al. |
| 2007/0097975 A1 | 5/2007 | Rakers et al. |
| 2007/0100822 A1 | 5/2007 | Freeman et al. |
| 2007/0127688 A1 | 6/2007 | Doulton |
| 2007/0282612 A1 | 12/2007 | Kaneko et al. |
| 2007/0294229 A1 | 12/2007 | Au |
| 2008/0021604 A1 | 1/2008 | Bouvier et al. |
| 2008/0049696 A1 | 2/2008 | Stewart |
| 2008/0052219 A1 | 2/2008 | Sandholm et al. |
| 2008/0071536 A1 | 3/2008 | Nagashima |
| 2008/0103781 A1 | 5/2008 | Wasson et al. |
| 2008/0227484 A1 | 9/2008 | Auvray et al. |
| 2008/0228494 A1 | 9/2008 | Cross |
| 2008/0243785 A1 | 10/2008 | Stading |
| 2008/0249855 A1 | 10/2008 | Collins et al. |
| 2008/0270223 A1 | 10/2008 | Collins et al. |
| 2008/0270224 A1 | 10/2008 | Portman et al. |
| 2008/0294609 A1 | 11/2008 | Liu et al. |
| 2008/0305778 A1 | 12/2008 | Aaltonen et al. |
| 2009/0210491 A1 | 8/2009 | Thakkar et al. |
| 2009/0228281 A1 | 9/2009 | Singleton et al. |
| 2009/0240670 A1 | 9/2009 | Tiyyagura et al. |
| 2010/0198772 A1 | 8/2010 | Silverman et al. |
| 2010/0306229 A1 | 12/2010 | Timm et al. |
| 2011/0010240 A1 | 1/2011 | Veach |
| 2011/0014925 A1 | 1/2011 | Antic et al. |
| 2011/0022460 A1 | 1/2011 | Bhatia et al. |
| 2011/0087660 A1 | 4/2011 | Yu et al. |
| 2011/0141925 A1 | 6/2011 | Velenko et al. |
| 2011/0202494 A1 | 8/2011 | Shin et al. |

(56) References Cited

U.S. PATENT DOCUMENTS

| | | |
|---|---|---|
| 2011/0264644 A1 | 10/2011 | Grant et al. |
| 2011/0295682 A1 | 12/2011 | Liu |
| 2011/0295990 A1 | 12/2011 | St. Jean et al. |
| 2011/0307436 A1 | 12/2011 | Cai et al. |
| 2011/0320114 A1 | 12/2011 | Buxton et al. |
| 2012/0016897 A1 | 1/2012 | Tulumbas et al. |
| 2012/0030015 A1 | 2/2012 | Brunsman et al. |
| 2012/0036226 A1 | 2/2012 | Chor |
| 2012/0101776 A1 | 4/2012 | Brower et al. |
| 2012/0102020 A1 | 4/2012 | Pearson |
| 2012/0102087 A1 | 4/2012 | Chor |
| 2012/0138671 A1 | 6/2012 | Gaede et al. |
| 2012/0155838 A1 | 6/2012 | Gerhards et al. |
| 2012/0158954 A1 | 6/2012 | Heffernan et al. |
| 2012/0166277 A1 | 6/2012 | Gnanamani et al. |
| 2012/0221724 A1 | 8/2012 | Chor |
| 2012/0265528 A1 | 10/2012 | Gruber et al. |
| 2012/0297174 A1 | 11/2012 | Frank et al. |
| 2013/0013749 A1 | 1/2013 | Kane et al. |
| 2013/0073400 A1 | 3/2013 | Heath |
| 2013/0117022 A1 | 5/2013 | Chen et al. |
| 2013/0124606 A1 | 5/2013 | Carpenter et al. |
| 2013/0144720 A1 | 6/2013 | Hari et al. |
| 2013/0185074 A1 | 7/2013 | Gruber et al. |
| 2013/0191226 A1 | 7/2013 | Smallwood et al. |
| 2013/0275164 A1 | 10/2013 | Gruber et al. |
| 2013/0304758 A1 | 11/2013 | Gruber et al. |
| 2013/0304789 A1 | 11/2013 | Herlein |
| 2013/0325449 A1 | 12/2013 | Levien et al. |
| 2013/0339030 A1 | 12/2013 | Ehsani et al. |
| 2014/0074895 A1 | 3/2014 | Ingerman et al. |
| 2014/0095583 A1 | 4/2014 | Houle |
| 2014/0115635 A1 | 4/2014 | Mashimo |
| 2014/0222436 A1 | 8/2014 | Binder et al. |
| 2014/0229184 A1 | 8/2014 | Shires |
| 2014/0337028 A1 | 11/2014 | Wang et al. |
| 2014/0350938 A1 | 11/2014 | Schroeter |
| 2015/0081288 A1 | 3/2015 | Kim |
| 2015/0106085 A1 | 4/2015 | Lindahl |
| 2015/0221305 A1 | 8/2015 | Sharifi |
| 2016/0105718 A1 | 4/2016 | Xu et al. |
| 2016/0180846 A1 | 6/2016 | Lee |
| 2016/0217790 A1 | 7/2016 | Sharifi |
| 2016/0223640 A1 | 8/2016 | Vilermo et al. |
| 2016/0246929 A1 | 8/2016 | Zenati et al. |
| 2016/0259497 A1 | 9/2016 | Foss et al. |
| 2017/0069317 A1 | 3/2017 | Kwon |
| 2017/0092278 A1 | 3/2017 | Evermann et al. |
| 2017/0110130 A1 | 4/2017 | Sharifi et al. |
| 2017/0110144 A1 | 4/2017 | Sharifi et al. |
| 2017/0132019 A1 | 5/2017 | Karashchuk et al. |
| 2017/0147585 A1 | 5/2017 | Kleindienst et al. |
| 2017/0289596 A1 | 10/2017 | Krasadakis et al. |
| 2017/0358301 A1 | 12/2017 | Raitio et al. |
| 2017/0358302 A1 | 12/2017 | Orr et al. |
| 2018/0322536 A1 | 11/2018 | Zhang et al. |

FOREIGN PATENT DOCUMENTS

| | | |
|---|---|---|
| GB | 2 305 747 | 4/1997 |
| JP | 11-065950 | 1/1900 |
| JP | 11-265347 | 9/1999 |
| JP | 2001-236410 | 8/2001 |
| JP | 2001-282982 | 10/2001 |
| JP | 2001-297256 | 10/2001 |
| JP | 2001-312646 | 11/2001 |
| JP | 2001-312649 | 11/2001 |
| JP | 2002-007253 | 1/2002 |
| JP | 2002-016970 | 1/2002 |
| JP | 2002-073666 | 3/2002 |
| JP | 2002-099822 | 4/2002 |
| JP | 2002-132827 | 5/2002 |
| JP | 2002-140359 | 5/2002 |
| JP | 2002-169744 | 6/2002 |
| JP | 2002-170027 | 6/2002 |
| JP | 2002-245048 | 8/2002 |
| JP | 2002-288541 A | 10/2002 |
| JP | 2003-016348 | 1/2003 |
| JP | 2003-122781 | 4/2003 |
| JP | 2003-223591 | 8/2003 |
| JP | 2003-263584 | 9/2003 |
| JP | 2003-337893 | 11/2003 |
| JP | 2004-032037 | 1/2004 |
| JP | 2006-236324 A | 9/2006 |
| JP | 2011-192102 | 3/2010 |
| JP | 2013-540306 A | 10/2013 |
| JP | 2015-001815 A | 1/2015 |
| JP | 2016-111406 A | 6/2016 |
| KR | 2000-0054165 A | 9/2000 |
| KR | 200054165 | 9/2000 |
| KR | 2002-69767 | 9/2002 |
| KR | 2003-39736 | 5/2003 |
| KR | 2010-0126796 A | 12/2010 |
| KR | 2015-0097816 A | 8/2015 |
| WO | WO-97/21183 A | 6/1997 |
| WO | WO-00/42544 | 7/2000 |
| WO | WO-01/59546 A2 | 8/2001 |
| WO | WO-01/93138 | 12/2001 |
| WO | WO-2012/094329 | 7/2012 |
| WO | WO-2014/004489 A1 | 1/2014 |
| WO | WO-2015/133022 A1 | 9/2015 |

OTHER PUBLICATIONS

95/001061 Reexamination—Miscellaneous Action dated Jul. 2, 2013 (4 pages).
95/001061 Reexamination—Reexamination Terminated dated Jul. 2, 2013 (4 pages).
95/001068 Reexamination—"Certificate of Service" dated Mar. 24, 2012 (1 page).
95/001068 Reexamination—"Inter Partes Reexamination Certificate" for 6829587-C1 dated Jan. 8, 2013 (2 pages).
95/001068 Reexamination—Appeal No. 2011-013241, "Decision on Appeal" dated Jan. 27, 2012 (34 pages).
95/001068 Reexamination—Appeal No. 2011-013241, "Notice of Appeal" dated Mar. 24, 2012 (3 pages).
95/001068 Reexamination—Case 12-1379, Document 20, "Order" by the US Court of Appeals for the Federal Circuit dated Sep. 6, 2012 (2 pages).
95/001069 Reexamination—"Certificate of Service" dated Mar. 24, 2012 (1 page).
95/001069 Reexamination—"Inter Partes Reexamination Certificate" for U.S. Pat. No. 7,249,059-C1 dated Jul. 23, 2013 (2 pages).
95/001069 Reexamination—Appeal No. 2011-010893, "Decision on Appeal" dated Jan. 27, 2012 (34 pages).
95/001069 Reexamination—Appeal No. 2011-010893, "Notice of Appeal" dated Mar. 24, 2012 (3 pages).
95/001069 Reexamination—Case 12-1380, Document 54-1, Decision by the US Court of Appeals for the Federal Circuit dated Mar. 7, 2013 (8 pages).
95/001069 Reexamination—Case 12-1380, Document 54-2, "Information Sheet" dated Mar. 7, 2013 (1 page).
95/001069 Reexamination—Case 12-1380, Document 54-3, "Questions and Answers: Petitions for Panel Rehearing (Fed. Cir. R. 40) and Petitions for Hearing or Rehearing En Banc (Fed. Cir. R. 35)" dated Mar. 7, 2013 (1 page).
95/001069 Reexamination—Case 12-1380, Document 54-4, "Notice of Entry of Judgment Accompanied by Opinion" dated Mar. 7, 2013 (2 pages).
95/001069 Reexamination—Case 12-1380, Document 55-3, "Mandate" dated Apr. 29, 2013 (2 pages).
95/001073 Reexamination—"Certificate of Service" dated Mar. 24, 2012 (1 page).
95/001073 Reexamination—"Inter Partes Reexamination Certificate" for U.S. Pat. No. 7,240,025-C1 dated Jul. 23, 2013 (2 pages).
95/001073 Reexamination—Appeal No. 2011-010719, "Decision on Appeal" dated Jan. 27, 2012 (27 pages).
95/001073 Reexamination—Appeal No. 2011-010719, "Notice of Appeal" dated Mar. 24, 2012 (3 pages).

(56) References Cited

OTHER PUBLICATIONS

95/001073 Reexamination—Case 12-1380, Document 54-1, Decision by the US Court of Appeals for the Federal Circuit dated Mar. 7, 2013 (8 pages).
95/001073 Reexamination—Case Dec. 1380, Document 55-3, "Mandate" by the US Court of Appeals for the Federal Circuit dated Apr. 29, 2013 (2 pages).
Examination Report for AU 2017384996 dated Nov. 25, 2019 (2 pages).
Final Office Action for U.S. Appl. No. 10/880868 dated Apr. 13, 2010 (8 pages).
Final Office Action for U.S. Appl. No. 10/880,868 dated Jul. 17, 2009 (7 pages).
Fisher et al., "The Role of Text Analytics and Information Retrieval in the Accounting Domain," Journal of Emerging Technologies in Accounting, vol. 7, Dec. 2010 (25 pages).
Non-Final Office Action for U.S. Appl. No. 13/840,380 dated Mar. 26, 2015 (26 pages).
Notice of Allowance for KR 10-2017-7031603 dated Mar. 28, 2019 (3 pages).
Notice of Allowance for U.S. Appl. No. 13/840,380 dated Sep. 20, 2019 (11 pages).
Notice of Allowance for U.S. Appl. No. 15/674,838 dated Sep. 20, 2019 (8 pages).
Notice of Allowance for U.S. Appl. No. 15/674,838 dated Dec. 3, 2019 (2 pages).
Notice of Allowance for U.S. Appl. No. 16/039,202 dated Oct. 9, 2019 (8 pages).
Notice of Allowance for U.S. Appl. No. 16/039,204 dated Oct. 30, 2019 (8 pages).
Xue et al., "Unstructured Queries Based on Mobile User Context," International Journal of Pervasive Computing and Communications, vol. 8, No. 4, dated Aug. 27, 2012 (28 pages).
Abrams, Help users find, interact & re-engage with your app on the Google Assistant, Google Developers Blog, Nov. 15, 2017, 16 pages.
Albrecht, "Alexa, How Can You Be Used in Restaurants?", the spoon, Dec. 10, 2017, 6 pages.
Barr, "AWS DeepLens—Get Hands-On Experience with Deep Learning With Our New Video Camera", AWS News Blog, Nov. 29, 2017, 11 pages.
Buckland et al., "Amazon's Alexa Takes Open-Source Route to Beat Google Into Cars", Bloomberg, Feb. 27, 2018, 6 pages.
Coberly, "Apple patent filing reveals potential whispering Siri functionality", Techspot, Dec. 14, 2017, 4 pages.
Estes, "Amazon's Newest Gadget Is a Tablet That's Also an Echo", Gizmodo, Sep. 19, 2017, 3 pages.
Foghorn Labs, 10 Tips to Improve the Performance of Google Product Listing Ads, printed from Internet address: http://www.foghornlabs.com/2012/11/21/product-listing-ads-best-practices/, on Mar. 18, 2013, 5 pages.
Google Inc., Products Feed Specification, printed from Internet address: http://www.support.google.com/merchants/bin/answer.py?hl=en&answer=188494#US, on Mar. 18, 2013, 6 pages.
Google Inc., Supported File Formats, printed from Internet address: http://www.support.google.com/merchants/bin/answer.py?hl=en&answer=160567, on Mar. 18, 2013, 1 page.
Heater, "Amazon Alexa devices can finally tell voices apart", TechCrunch, Oct. 11, 2017, 6 pages.
International Search Report and Written Opinion on International Application No. PCT/US2017/049782, dated Oct. 25, 2017, 16 pages.
Johnston, "Amazon Whirlwind: New Echo, Plus, Spot, Connect, Fire TV Take the Stage", Twice, Sep. 27, 2017, 4 pages.
Kelion, "Amazon revamps Echo smart speaker family", BBC News, Sep. 27, 2017, 11 pages.
Krishna, "Jim Beam's smart decanter will pour you a shot when you ask", engadget, Nov. 29, 2017, 3 pages.
Lacy, "Improving search and advertising are the next frontiers for voice-activated devices", TechCrunch, Dec. 20, 2017, 13 pages.
Lee, Take Two for Samsung's troubled Bixby assistant, BBC News, Oct. 19, 2017, 6 pages.
Lund, Pamela, Mastering Google Product Feeds and Product Listing Ads $2013 Part 1, found at http://www.blueglass.com/blog/mastering-google-product-feeds-and-product-listing-ads-part-1/#comments, Dec. 28, 2013, 17 pages.
Notice of Allowance for U.S. Appl. No. 13/441,298 dated Nov. 2, 2017, 11 pages.
Novet, et al., "Amazon is getting ready to bring Alexa to work", CNBC, Nov. 29, 2017, 4 pages.
Palladino, "Garmin teamed up with Amazon to make a tiny Echo Dot for your car", ars Technica, Oct. 17, 2017, 2 pages.
Perez, "Alexa's 'Routines' will combine smart home control with other actions, like delivering your news and weather", TechCrunch, Sep. 28, 2017, 10 pages.
Pringle, "'I'm sorry to hear that': Why training Siri to be a therapist won't be easy", CBC News, Sep. 24, 2017, 3 pages.
Unknown Author, "'Dolphin' attacks fool Amazon, Google voice assistants", BBC News, Sep. 7, 2017, 8 pages.
U.S. Notice of Allowance for U.S. Appl. No. 13/478,998 dated Jan. 26, 2018, 8 pages.
U.S. Notice of Allowance for U.S. Appl. No. 15/395,703 dated Feb. 14, 2018, 9 pages.
U.S. Office Action for U.S. Appl. No. 13/840,380 dated Dec. 6, 2017, 13 pages.
Non-Final Office Action for U.S. Appl. No. 10/880,868 dated Sep. 23, 2009 (7 pages).
Notice of Allowance for KR Appln. Ser. No. 10-2019-7018803 dated Oct. 11, 2019 (3 pages).
Notice of Allowance for U.S. Appl. No. 13/840,380 dated Dec. 11, 2019 (12 pages).
Dickinger et. al, "An Investigation of Conceptual Model of SMS Marketing", Proceedings of 37th Hawaii International Conference on System Sciences, Jan. 2004, pp. 1-10 (10 pages).
International Preliminary Report on Patentability for Appl. Ser. No. PCT/US2013/042376 dated Dec. 4, 2014 (10 pages).
International Preliminary Report on Patentability for Appl. Ser. No. PCT/US2013/077834 dated Aug. 13, 2015 (7 pages).
International Preliminary Report on Patentability for Appl. Ser. No. PCT/US2017/049782 dated Jul. 11, 2019 (12 pages).
Jp Office Action for Appl. Ser. No. 2017-556912 dated Mar. 4, 2019 (8 pages).
Kr Office Action for Appl. Ser. No. 10-2017-7031603 dated Jan. 22, 2019 (8 pages).
Pure Oxygen Labs, "How to Deep Link to Alexa Skills," Oct. 11, 2017 (16 pages).
U.S. Notice of Allowance for U.S. Appl. No. 13/478,998 dated Apr. 23, 2018 (8 pages).
U.S. Notice of Allowance for U.S. Appl. No. 13/478,998 dated Sep. 21, 2018 (8 pages).
U.S. Notice of Allowance for U.S. Appl. No. 13/840,380 dated May 14, 2019 (8 pages).
U.S. Notice of Allowance for U.S. Appl. No. 15/395,703 dated Apr. 4, 2018 (2 pages).
U.S. Notice of Allowance for U.S. Appl. No. 15/395,703 dated May 17, 2018 (5 pages).
U.S. Notice of Allowance for U.S. Appl. No. 16/039,202 dated Apr. 4, 2019 (8 pages).
U.S. Notice of Allowance for U.S. Appl. No. 16/039,202 dated Dec. 10, 2018 (8 pages).
U.S. Notice of Allowance for U.S. Appl. No. 16/039,202 dated Jul. 17, 2019 (8 pages).
U.S. Notice of Allowance for U.S. Appl. No. 16/039,204 dated Dec. 10, 2018 (8 pages).
U.S. Notice of Allowance for U.S. Appl. No. 16/039,204 dated Jan. 17, 2019 (3 pages).
U.S. Notice of Allowance for U.S. Appl. No. 16/039,204 dated Jul. 15, 2019 (8 pages).
U.S. Notice of Allowance for U.S. Appl. No. 16/039,204 dated Mar. 20, 2019 (8 pages).
U.S. Office Action for U.S. Appl. No. 15/584,970 dated Nov. 16, 2018 (21 pages).

(56) References Cited

OTHER PUBLICATIONS

U.S. Office Action for U.S. Appl. No. 16/039,204 dated Aug. 15, 2018 (21 pages).
U.S. Office Action for U.S. Appl. No. 13/840,380 dated Aug. 3, 2018 (12 pages).
U.S. Office Action for U.S. Appl. No. 14/172,353 dated Apr. 4, 2018 (22 pages).
U.S. Office Action for U.S. Appl. No. 14/172,353 dated Dec. 14, 2018 (21 pages).
U.S. Office Action for U.S. Appl. No. 14/172,353 dated May 17, 2018 (20 pages).
U.S. Office Action for U.S. Appl. No. 15/084,223 dated Sep. 4, 2018 (13 pages).
U.S. Office Action for U.S. Appl. No. 15/189,826 dated Jun. 3, 2019 (31 pages).
U.S. Office Action for U.S. Appl. No. 15/189,826 dated Nov. 9, 2018 (30 pages).
U.S. Office Action for U.S. Appl. No. 15/491,734 dated Jan. 30, 2019 (26 pages).
U.S. Office Action for U.S. Appl. No. 15/491,734 dated May 28, 2019 (24 pages).
U.S. Office Action for U.S. Appl. No. 15/584,970 dated May 31, 2019 (23 pages).
U.S. Office Action for U.S. Appl. No. 15/603,701 dated Apr. 2, 2019 (14 pages).
U.S. Office Action for U.S. Appl. No. 15/603,701 dated Nov. 2, 2018 (13 pages).
U.S. Office Action for U.S. Appl. No. 15/674,838 dated Jun. 10, 2019 (6 pages).
U.S. Office Action for U.S. Appl. No. 15/674,838 dated Nov. 30, 2018 (11 pages).
U.S. Office Action for U.S. Appl. No. 16/039,202 dated Aug. 14, 2018 (19 pages).
95/001061, Reexamination of Stone et al.
95/001068, Reexamination of Stone et al.
95/001069, Reexamination of Stone et al.
95/001073, Reexamination of Stone et al.
Best practices for creating adaptive user interfaces with the mobile Internet toolkit:, Microsoft Corporation, Jan. 2002, pp. 1-2. Downloaded Dec. 21, 2006 from http://msdn.microsoft.com/library/default.asp?url=/library/en-us/dnmitta/html/bestpractaui.asp.
"eStara Push to Talk: The most popular click to call service in the world," downloaded from htto://www.estara.com on Jun. 29, 2004, 2 pgs.
"Ingenio: Click to Call Solutions," downloaded fromhttto://www.in2enio.com/documents/cominfo/clicktocall.aso?TF=I on Jun. 29, 2004, 3 pgs.
"Walmart and Google to offer voice-enabled shopping", BBC News, Aug. 23, 2017.
AdForce, Inc., A Complete Guide to AdForce, Version 2.6, 1998.
AdForce, Inc., S-1/A SEC Filing, May 6, 1999.
AdKnowledge Campaign Manager: Reviewer's Guide, AdKnowledge, Aug. 1998.
AdKnowledge Market Match Planner: Reviewer's Guide, AdKnowledge, May 1998.
Ad-Star.com website archive from www.Archive.org, Apr. 12, 1997 and Feb. 1, 1997.
Amazon, "Echo Look | Hands-Free Camera and Style Assistant", reprinted from https://www.amazon.com/gp/product/B0186JAEWK?ref%5F=cm%5Fsw%5Fr%5Ffa%5Fdp%5Ft2%5FC5oazbJTKCB18&pldnSite=1 on Aug. 22, 2017 (7 pages).
Baseview Products, Inc., AdManagerPro Administration Manual v. 2.0, Dec. 1998.
Baseview Products, Inc., ClassManagerPro Administration Manual v. 1.0.5, Feb. 1, 1997.
Broussard, Mitchel, "Chatbot-Like Siri Patent Includes Intelligent Image, Video, and Audio Recognition Within Messages", May 11, 2017, 11 pages.
Business Wire, "Global Network, Inc. Enters Into Agreement in Principle With Major Advertising Agency," Oct. 4, 1999.

Canadian Office Action on 2572468 dated Dec. 4, 2014.
Canadian Office Action on 2572468 dated Sep. 17, 2013.
Canadian Office Action on 2572471 dated Jan. 9, 2014.
Canadian Office Action on CA 2,572,471 dated Mar. 3, 2015.
Canadian Office Action to Canadian Patent Application No. 2,572,471 dated Mar. 16, 2009.
Chapter 12, Managing the Product, Class Notes, University of Delaware, http://www.udel.edu/alex/chapt12.html, accessed Mar. 13, 2015, 10 pgs.
Chen, Yilun Lulu, "Alibaba Challenges Google, Amazon With New Echo-Like Device", Bloomberg, Jul. 5, 2017, 3 pages.
Close, "Amazon Echo Will Give You These Deals If You Order Through Alexa This Weekend," Web Article, Nov. 18, 2016, Time.com (2 pages).
Clover, Juli, "Amazon and Google Want to Turn Their Smart Home Speakers Into Telephone Replacements", MacRumors, Feb. 15, 2017 (5 pages).
Collins, et al., "Can Twitter Save Itself?", cnet, Apr. 26, 2017, reprinted from https://www.cnet.com/news/twitter-q1-2017-earnings/ on Aug. 22, 2017 (2 pages).
Cook, "A Siri for advertising: These mobile ads talk back to you," Web Article, Apr. 1, 2013, Geekwire.com (7 pages).
Crist, Ry, "Logitech Harmony's Alexa Skill just got a whole lot better", cnet, Jul. 13, 2017 (2 pages).
Decision of Rejection for Japanese Patent Application No. 2007-519374, dated Jun. 15, 2010 (3 pgs.) with translation (3 pgs.).
Decision of Rejection for Japanese Patent Application No. 2007-519407 dated Feb. 23, 2010.
Decision to Dismiss the Amendment for Korean Patent Application No. 10-2007-7002383 dated Jul. 9, 2010.
Dedrick, R., A Consumption Model for Targeted Electronic Advertising, Intel Architecture Labs, IEEE, 1995.
Dedrick, R., Interactive Electronic Advertising, IEEE, 1994.
Dickinger et al., "An Investigation and Conceptual Model of SMS Marketing," Proceedins of the 37th Hawaii International Conference on System Sciences, 2004, 10 pages.
European Office Action for EP Application No. 05763971.8, dated Mar. 29, 2011.
European Office Action on 05768157.9 dated Jan. 27, 2014.
European Office Action on EP 05 768 157.9 dated Aug. 21, 2014.
European Office Action on EP 05 768 157.9 dated Jul. 23, 2015.
Examiner's First Report on Australian Patent Application No. 2005259861 dated Mar. 6, 2008 (2 pgs.).
Examiner's First Report to Australian Patent Application No. 2005260566 dated Mar. 4, 2008.
Examiner's Re-Examination Report for Australian Patent Application No. 2005259861, dated Dec. 1, 2011 (2 pgs.).
Examiner's Report for Canadian Patent Application No. 2,572,468, dated Dec. 29, 2011 (4 pgs.).
First Examination Report for Indian Patent Application No. 144/MUMNP/2007, dated Jun. 19, 2008 (2 pgs.).
First Office Action for Japanese Patent Application No. 2010-142707 dated Nov. 13, 2012.
First Office Action for Japanese Patent Application No. 2010-232591, dated Feb. 19, 2013 (3 pgs.) with translation (4 pgs.).
Forrest, Conner, "Essential Home wants to be 'bridge' between Amazon Alexa, Apple's Siri, and Google Assistant," TechRepublic, May 31, 2017, 9 pages.
Foxx, Chris, "Apple reveals HomePod smart speaker", BBC, Jun. 5, 2017, 9 pages.
Gebhart, Andrew, "Google Assistant is spreading, but it needs its own 'Echo Dot'", Cnet, May 20, 2017, 6 pages.
Gebhart, Andrew, "Google Home to the Amazon Echo: 'Anything you can do . . . '", cnet, May 18, 2017 (7 pages).
Gibbs, Samuel, "Your Facebook Messenger app is about to be filled with ads", The Guardian, Jul. 12, 2017 (3 pages).
Golgowski, Nina, "This Burger King Ad Is Trying to Control Your Google Home Device", Huffpost, Apr. 12, 2017 (7 pages).
Google Developers Newsletter "Google Assistant SDK", developers.google.com, retrieved on Jul. 12, 2017, 2 pages.
Gurma, Mark and Webb, Alex, "Apple Is Manufacturing a Siri Speaker to Outdo Google and Amazon", Bloomberg, May 31, 2017, 3 pages.

(56) References Cited

OTHER PUBLICATIONS

Hardwick, Tim, "Facebook Smart Speaker Coming Next Year With 15-inch Touch Panel", MacRumors, Jul. 25, 2017 (5 pages).
Information Access Technologies, Inc., Aaddzz brochure, "The Best Way to Buy and Sell Web Advertising Space," © 1997.
Information Access Technologies, Inc., Aaddzz.com website archive from www.Archive.org, archived on Jan. 30, 1998.
International Search Report & Written Opinion on PCT/US2013/042376 dated Feb. 28, 2014.
International Search Report on International Application No. PCT/US2005/023023, dated Oct. 23, 2006, 2 pages.
Japanese Decision of Rejection on 2010-232591 dated Jan. 27, 2014.
Japanese Office Action issued in JP application 2010-142707 dated Jul. 23, 2013.
Japanese Office Action on JP 2014-010608 dated Nov. 18, 2014, 12 pages (English translation).
Japanese Office Action on JP2010-232591 dated Jun. 9, 2015.
Jones, Matt et al., "Improving Web Interaction in Small Displays", Computer Networks, vol. 31, pp. 1129-1137 (May 17, 1999).
Kato, Sako, "Keyword Advertisement", Internet Magazine, 2nd Stage, No. 2,pp. 112-123, Japan, Impress Holdings, Inc. (May 1, 2004).
Kelion, Leo, "Amazon's race to make Alexa smarter", BBC News, Jul. 28, 2017 (8 pages).
Koetsier, John, "Ads on Amazon Echo: Wendy's, ESPN, and Progressive Among Brands Testing", Forbes, May 11, 2017, 3 pages.
Larson, Selena, "Google Home now recognizes your individual voice", CNN Money, San Francisco, California, Apr. 20, 2017 (3 pages).
Lee, Dave, "The five big announcements from Google I/O", BBC, May 18, 2017, 11 pages.
Microsoft Corporation, "Best Practices for Creating Adaptive User Interfaces with the Mobile Internet Toolkit", Jan. 2002, pp. 1-2, XP008144654.
Morton to Baluja email (1 pg) dated Jan. 12, 2006.
Nieva, Richard, "Google Home and eBay can tell you how much that's worth", cnet, Mar. 8, 2017 (3 pages).
Notice of Final Rejection for Korean Patent Application No. 10-2007-7002383 dated Apr. 22, 2010.
Notice of Final Rejection for Korean Patent Application No. 10-2007-7002385 dated Jul. 30, 2009 (5 pgs.) with translation (5 ps.).
Notice of Final Rejection for Korean Patent Application No. 10-2010-7013914 dated Sep. 14, 2011.
Notice of Preliminary Rejection for Korean Patent Application No. 10-2007-7002383 dated Jun. 10, 2008.
Notice of Preliminary Rejection for Korean Patent Application No. 10-2007-7002385, dated Jun. 10, 2008 (5 pgs.) with translation (6 pgs.).
Notice of Preliminary Rejection for Korean Patent Application No. 10-2010-7013914, dated Sep. 17, 2010.
Notice of Reasons for Rejection for Japanese Patent Application No. 2007-519374 dated Aug. 25, 2009 (3 pgs.) with translation (4 pgs.).
Notice of Reasons for Rejection for Japanese Patent Application No. 2007-519407 dated Jul. 7, 2009.
Notification of Preliminary Rejection for Korean Patent Application No. 10-2007-7002383 dated Jun. 10, 2009.
Notification of the First Office Action for Chinese Patent Application No. 200580025826.2 dated Dec. 18, 2009 (6 pgs.) with translation (7 pgs.).
Notification of the Second Office Action for Chinese Patent Application No. 200580025826.2, dated Jul. 22, 2011 (3 pgs.) with translation (4 pgs.).
Notification of the Second Office Action for Chinese Patent Application No. 200580025878.X, dated Oct. 26, 2011.
Notification of the Third Office Action for Chinese Patent Application No. 200580025826.2 dated Apr. 11, 2012 (5 pgs.) with translation (7 pgs.).
Notification of the Third Office Action for Chinese Patent Application No. 200580025878.X, dated Feb. 21, 2012.
Office Action for Canadian Patent Application No. 2,572,471, dated May 21, 2010.
Office Action for Chinese Patent Application No. 200580025878.X, dated May 7, 2010.
Office Action for European Patent Application No. 05 763 971.8-2221 dated Mar. 29, 2011 (4 pgs.).
Office Action for European Patent Application No. 05768157.9-1958, dated Feb. 15, 2013.
Office Action for Japanese Patent Application No. 2007-519374, dated May 29, 2012 (19 pgs.) with translation (28 pgs.).
Office Action on U.S. Appl. No. 14/230,508 dated Nov. 28, 2014.
Official Letter of Inquiry for Japanese Patent Application No. 2007-519374 dated Oct. 4, 2011 (3 pgs.).
Page to Karima email (1 page) dated Jan. 12, 2006.
Patently Apple, "Apple Patent Reveals a New Security Feature Coming to Siri", Apr. 4, 2017, reprinted from http://www.patentlyapple.com/patently-apple/2017/04/apple-patent-reveals-a-new-security-feature-coming-to-siri.html, on Aug. 22, 2017 (6 pages).
Patently Mobile, "The Patent behind Google Home's new Feature of Understanding Different Voices in the Home Surfaced Today", Apr. 20, 2017, reprinted from http://www.patentlymobile.com/2017/04/the-patent-behind-google-homes-new-feature-of-understanding-different-voices-in-the-home-surfaced-today.html, on Aug. 22, 2017 (3 pages).
PCT International Search Report (PCT/ISA/210) for International Application No. PCT/US05/23023 (2 pgs.) (dated Oct. 23, 2006).
PCT Written Opinion of the International Searching Authority (PCT/ISA/237) for International Application No. PCT/US05/23023 (3 pgs.) dated Oct. 23, 2006.
PCT/ISA/210, International Search Report for PCT/US05/23162 dated Feb. 5, 2007.
PCT/ISA/237, Written Opinion of the International Searching Authority forPCT/US05/23162 dated Feb. 5, 2007.
Perez, Sarah, "The first ad network for Alexa Skills shuts down following Amazon's policy changes", Tech Crunch, Jun. 15, 2017, 8 pages.
Porter, Jon, "Amazon Echo Show release date, price, news and features", Tech Radar, Jun. 26, 2017, 11 pages.
Purcher, Jack, Today Google Home's Virtual Assistant can learn its Owner's voice for Security Reasons like Apple's Patent Pending Idea, Apr. 20, 2017, 4 pages.
Request for Reexamination of U.S. Pat. No. 6,446,045 B1, Control No. 95/001,061 dated Jul. 7, 2008.
Request for Reexamination of U.S. Pat. No. 6,829,587 B2, Control No. 95/001,068, dated Jul. 14, 2008.
Request for Reexamination of U.S. Pat. No. 7,240,025 B2, Control No. 95/001,073, dated Jul. 30, 2008.
Request for Reexamination of U.S. Pat. No. 7,249,059 B2, Control No. 95/001,069, dated Jul. 21, 2008.
Sablich, Justin, "Planning a Trip With the Help of Google Home", New York Times, dated May 31, 2017, 6 pages.
Seifert, Dan, "Samsung's new virtual assistant will make using your phone easier", The Verge, Mar. 20, 2017 (6 pages).
Sherr, Ian, "IBM built a voice assistant for cybersecurity", cnet, Feb. 13, 2017 (2 pages).
Shintaro Gotoh et al., "Citizens Lectures on GIS using MANDARA and EXCEL, Make a Map by PC," Kokin Shoin (1st ed., Apr. 5, 2004, ISBN 4-7722-4051-9, Kokon, Japan) p. 62.
Siegal, Daniel, "IP Attys Load Up Apps' Legal Challenges at 'Silicon Beach'", Law360, Los Angeles, California, Feb. 2, 2017 (4 pages).
Simonite, "How Alexa, Siri, and Google Assistant Will Make Money Off You," Web Article, May 31, 2016, technologyreview.com (11 pages).
Simonite, "How Assistant Could End Up Eating Google's Lunch," Web Article, Sep. 23, 2016, technologyreview.com (9 pages).
Smith, Dave, "The Amazon Echo got 2 incredibly useful features thanks to a new update", Business Insider, Jun. 1, 2017, 2 pages.
Statement of Grounds and Particulars in Support of Opposition for Australian Patent Application No. 2005259861, dated Jan. 22, 2010 (13 pgs.).

(56) References Cited

OTHER PUBLICATIONS

Supplementary European Search Report for European Patent Application No. 05768157.9 dated Oct. 31, 2012.
Tedeschi, Bob, "Transforming Clicks Into Rings," (Jun. 7, 2004) downloaded from www.nvtimes.com on Jun. 6, 2004, 3 pgs.
The International Search Report and the Written Opinion of the International Searching Authority for Application No. PCT/US2013/077834 dated Apr. 24, 2014, 5 pages.
U.S. Final Office Action on U.S. Appl. No. 13/441,298 dated Dec. 30, 2013.
U.S. Notice of Allowance on U.S. Appl. No. 13/478,998 dated Sep. 12, 2017.
U.S. Office Action on U.S. Appl. No. 10/880,686 dated May 7, 2008.
U.S. Office Action on U.S. Appl. No. 10/880,868 dated Apr. 1, 2016.
U.S. Office Action on U.S. Appl. No. 10/880,868 dated Dec. 4, 2008.
U.S. Office Action on U.S. Appl. No. 10/880,868 dated Mar. 24, 2015.
U.S. Office Action on U.S. Appl. No. 10/880,868 dated Nov. 28, 2014.
U.S. Office Action on U.S. Appl. No. 11/026,507 dated Apr. 6, 2015.
U.S. Office Action on U.S. Appl. No. 11/026,507 dated Aug. 14, 2014.
U.S. Office Action on U.S. Appl. No. 11/026,507 dated Jan. 12, 2010.
U.S. Office Action on U.S. Appl. No. 11/026,507 dated Jul. 21, 2010.
U.S. Office Action on U.S. Appl. No. 11/026,507 dated Mar. 24, 2011.
U.S. Office Action on U.S. Appl. No. 11/026,507 dated Mar. 30, 2009.
U.S. Office Action on U.S. Appl. No. 11/026,507 dated Oct. 29, 2015.
U.S. Office Action on U.S. Appl. No. 13/441,298 dated Jul. 17, 2013.
U.S. Office Action on U.S. Appl. No. 13/441,298 dated Jul. 6, 2015.
U.S. Office Action on U.S. Appl. No. 13/441,298 dated Nov. 20, 2015.
U.S. Office Action on U.S. Appl. No. 13/441298 dated Jan. 13, 2017.
U.S. Office Action on U.S. Appl. No. 13/478,998 dated Jul. 31, 2015.
U.S. Office Action on U.S. Appl. No. 13/478,998 dated Feb. 27, 2017.
U.S. Office Action on U.S. Appl. No. 13/840,380 dated Oct. 22, 2015.
U.S. Office Action on U.S. Appl. No. 13/840,380 dated Aug. 12, 2016.
U.S. Office Action on U.S. Appl. No. 13/840,380 dated Feb. 27, 2017.
U.S. Office Action on U.S. Appl. No. 14/155,323 dated May 7, 2015.
U.S. Office Action on U.S. Appl. No. 14/172,353 dated Jul. 6, 2015.
U.S. Office Action on U.S. Appl. No. 14/172,353 dated Jan. 21, 2016.
U.S. Office Action on U.S. Appl. No. 14/230,508 dated Feb. 1, 2016.
U.S. Office Action on U.S. Appl. No. 14/230,508 dated Jun. 3, 2015.
U.S. Office Action on U.S. Appl. No. 15/395,703 dated Oct. 19, 2017.
U.S. Office Action on U.S. Appl. No. 13/478,998 dated Jan. 20, 2016.
U.S. Office Action on U.S. Appl. No. 13/478,998 dated Oct. 5, 2016.
U.S. Office Action on U.S. Appl. No. 14/172,353 dated Aug. 10, 2017, 15 pages.
U.S. Office Action on U.S. Appl. No. 14/172,353 dated Feb. 9, 2017.
Willens, Max, "For publishers, Amazon Alexa holds promise but not much money (yet)", Digiday, Jul. 6, 2017, 5 pages.
Zeff, R. et al., Advertising on the Internet, 2nd Ed., John Wiley & Sons, 1999.
JP Notice of Allowance for Appln. Ser. No. 2017-556912 dated Aug. 9, 2019 (6 pages).
Non-Final Office Action on U.S. Appl. No. 15/603,701 dated Sep. 12, 2019 (14 pages).
Non-Final Office Action on U.S. Appl. No. 15/638,291 dated Sep. 6, 2019 (22 pages).
Non-Final Office Action on U.S. Appl. No. 15/638,295 dated Sep. 6, 2019 (26 pages).
Final Office Action for U.S. Appl. No. 15/638,291 dated Jan. 30, 2020 (24 pages).
Final Office Action for U.S. Appl. No. 15/638,295 dated Jan. 30, 2020 (25 pages).
Non-Final Office Action for U.S. Appl. No. 16/666,780 dated Jan. 27, 2020 (10 pages).
Notice of Allowance for U.S. Appl. No. 15/491,734 dated Jan. 31, 2020 (18 pages).
Notice of Allowance for U.S. Appl. No. 15/603,701 dated Jan. 10, 2020 (8 pages).
Office Action on KR 10-2019-7018803 dated Jul. 16, 2019 (7 pages).
"Wiley Encyclopedia of Computer Science and Engineering: vol. I", Wiley-Interscience, Nov. 2008 (2365 pages).
Non-Final Office Action for U.S. Appl. No. 15/587,132 dated Mar. 5, 2020 (24 pages).
Notice of Allowance for U.S. Appl. No. 15/674.838 dated Mar. 11, 2020 (8 pages).
Notice of Allowance for U.S. Appl. No. 15/603,701 dated Apr. 22, 2020 (8 pages).
Notice of Allowance for U.S. Appl. No. 16/666,780 dated Apr. 14, 2020 (6 pages).

* cited by examiner

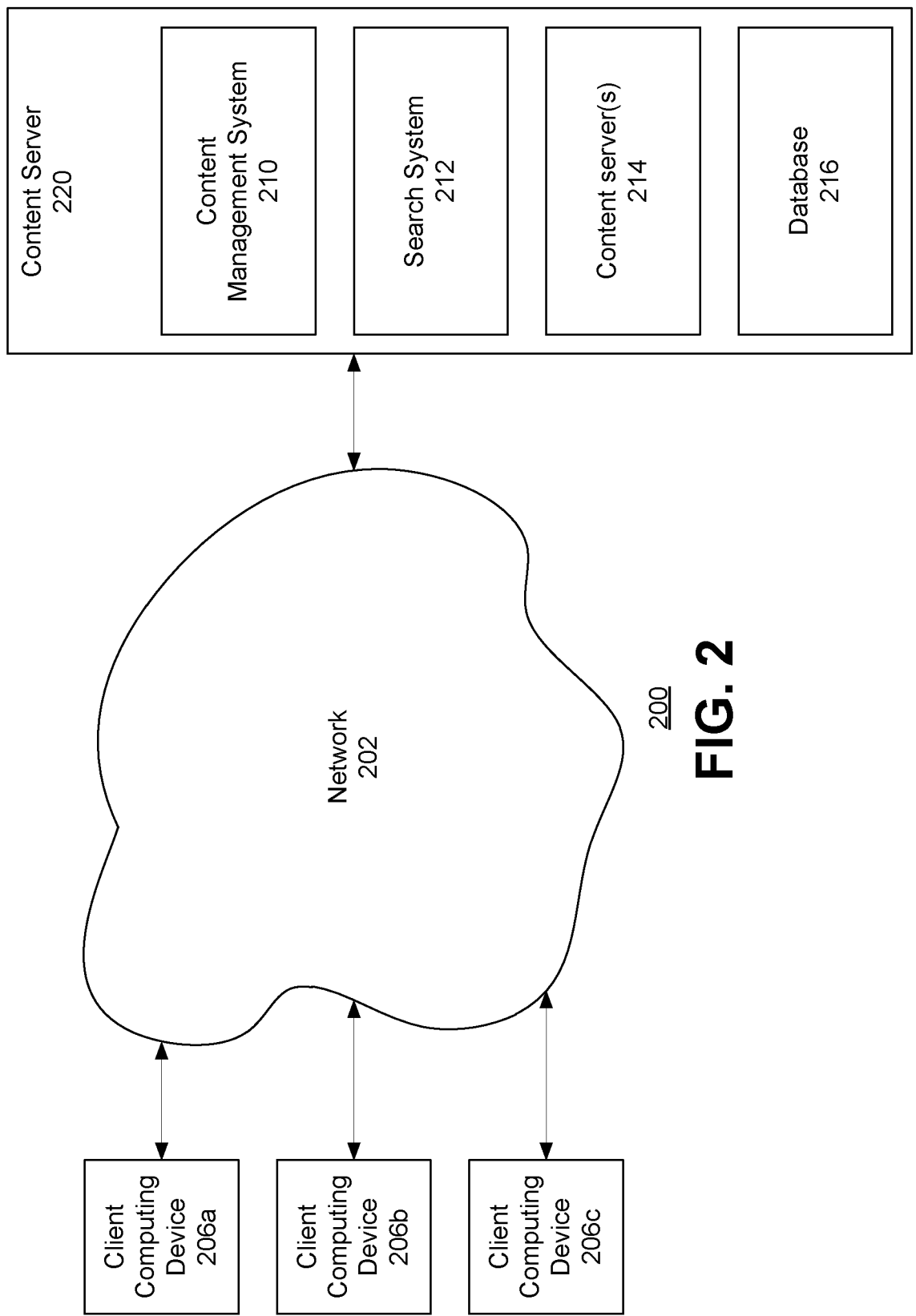

METHODS AND SYSTEMS FOR IDENTIFYING NEW COMPUTERS AND PROVIDING MATCHING SERVICES

The present application also claims the benefit of priority under 35 U.S.C. § 120 as a continuation-in-part of U.S. patent application Ser. No. 13/478,998, filed on May 23, 2012. The present application also claims the benefit of priority under 35 U.S.C. § 120 as a continuation-in-part of U.S. patent application Ser. No. 15/395,703, filed Dec. 30, 2016. Each of the foregoing are hereby incorporated by reference herein in their entirety.

TECHNICAL FIELD

The disclosure relates generally to the field of service providing systems and methods, and, in particular, to systems and methods for matching content to user interests.

BACKGROUND

The Internet provides access to a wide variety of content. The ability to search that content and provide intelligent search results to a user continues to be a challenge. Moreover, excessive network transmissions, packet-based or otherwise, of network traffic data between computing devices can prevent a computing device from properly processing the network traffic data, completing an operation related to the network traffic data, or timely responding to the network traffic data. The excessive network transmissions of network traffic data can also complicate data routing or degrade the quality of the response if the responding computing device is at or above its processing capacity, which may result in inefficient bandwidth utilization. The control of network transmissions corresponding to content item objects can be complicated by the large number of content item objects that can initiate network transmissions of network traffic data between computing devices. Content providers decide which content is displayed using various management tools. These tools also allow a content provider to track the performance of various content items, ads or content campaigns. The parameters used to determine when to display a particular content item can also be changed using digital content management tools.

SUMMARY OF THE DISCLOSURE

A method of providing services to computing devices includes, but is not limited to, any one or combination of: (i) establishing a connection over the Internet with a computing device; (ii) receiving data from the computing device during the connection; (iii) extracting a signal from the data received from the computing device; (iv) estimating a relative age of the computing device based on the extracted signal; (v) selecting a service from a plurality of services based on the estimated relative age of the computing device; and (vi) providing the selected service to the computing device.

A data processing system can identify an optimal transmission modality for data packet (or other protocol based) transmission in a voice activated computer network environment. The data processing system can improve the efficiency and effectiveness of data packet transmission over one or more computer networks by, for example, selecting a transmission modality from a plurality of options for data packet routing through a computer network of content items to one or more client computing device, or to different interfaces (e.g., different apps or programs) of a single client computing device. Data packets or other protocol based signals corresponding to the selected operations can be routed through a computer network between multiple computing devices. For example the data processing system can route a content item to a different interface than an interface from which a request was received. The different interface can be on the same client computing device or a different client computing device from which a request was received. The data processing system can select at least one candidate interface from a plurality of candidate interfaces for content item transmission to a client computing device. The candidate interfaces can be determined based on technical or computing parameters such as processor capability or utilization rate, memory capability or availability, battery status, available power, network bandwidth utilization, interface parameters or other resource utilization values. By selecting an interface to receive and provide the content item for rendering from the client computing device based on candidate interfaces or utilization rates associated with the candidate interfaces, the data processing system can reduce network bandwidth usage, latency, or processing utilization or power consumption of the client computing device that renders the content item. This saves processing power and other computing resources such as memory, reduces electrical power consumption by the data processing system and the reduced data transmissions via the computer network reduces bandwidth requirements and usage of the data processing system.

In various implementations, the extracted signal comprises a unique identifier of the computing device. In some implementations, the estimating includes analyzing the unique identifier of the computing device for a pattern. The relative age of the computing device is estimated based on the pattern. In further implementations, the estimating includes comparing the pattern with a database of known patterns for corresponding respective relative ages to estimate the relative age of the computing device.

In various implementations, the estimated relative age of the computing device comprises an estimated relative age range of the computing device. In some implementations, the estimated relative age of the computing device includes a probability that the relative age of the computing device is in the estimated relative age range of the computing device.

In various implementations, the relative age of the computing device is estimated based on an amount of certain information provided in the extracted signal. In some implementations, the estimated relative age is a first relative age if the amount of the certain information provided in the extracted signal is less than a specified threshold. The estimated relative age is a second relative age if the amount of the certain information provided in the extracted signal is or exceeds a specified threshold.

In various implementations, the relative age of the computing device is estimated based on presence or absence of certain information provided in the extracted signal. In some implementations, the estimated relative age is a first relative age if the certain information is present in the extracted signal. The estimated relative age is a second relative age if the certain information is absent in the extracted signal.

In various implementations, the relative age of the computing device is estimated based on order of certain information provided in the extracted signal. In some implementations, the estimated relative age is a first relative age if the order of the certain information is in a predetermined order.

The estimated relative age is a second relative age if the order of the certain information is not in the predetermined order.

In various implementations, the method further includes providing a query or command to the computing device. The data is received from the computing device in response to the query or command.

In some implementations, the extracted signal provides information relating to latency of performance of the computing device in response to the query or command. The relative age is estimated based on the latency of the computing device.

In various implementations, the service comprises a content item.

In various implementations, the selecting includes selecting a content campaign from a plurality of content campaigns based on the estimated relative age of the computing device.

In various implementations, the selecting includes selecting a content item, provided on a server, from a plurality of content items based on the estimated relative age of the computing device. The providing includes delivering the selected content item to the computing device.

In various implementations, a first service is selected from the plurality of services if the estimated relative age of the computing device is less than a specified threshold. A second service is selected from the plurality of services if the estimated relative age of the computing device is or exceeds the specified threshold.

In various implementations, the service comprises an offer. The selecting includes selecting an offer from a plurality of offers based on the estimated relative age of the computing device. The providing includes delivering the offer to the computing device. In some implementations, the offer includes providing a benefit to a user in response to the user performing a predetermined action. In further implementations, the predetermined action comprises changing a default configuration of the computing device. In yet further implementations, the default configuration of the computing device comprises a default search engine for the computing device. In yet further implementations, the default configuration of the computing device comprises a default browser for the computing device.

An apparatus for providing services includes, but is not limited to any one or combination of, means for establishing a connection over the Internet with a computing device; means for receiving data from the computing device during the connection; means for extracting a signal from the data received from the computing device; means for estimating a relative age of the computing device based on the extracted signal; means for selecting a service from a plurality of services based on the estimated relative age of the computing device; and means for providing the selected service to the computing device.

An apparatus for providing services includes, but is not limited to any one or combination of a processor configured for establishing a connection over the Internet with a computing device. The processor configured for receiving data from the computing device during the connection. The processor configured for extracting a signal from the data received from the computing device. The processor configured for estimating a relative age of the computing device based on the extracted signal. The processor configured for selecting a service from a plurality of services based on the estimated relative age of the computing device. The processor configured for providing the selected service to the computing device.

A computer program product for providing services, the computer program product including a non-transitory computer-readable storage medium having code for (but not limited to any one or combination of): (i) establishing a connection over the Internet with a computing device; (ii) receiving data from the computing device during the connection; (iii) extracting a signal from the data received from the computing device; (iv) estimating a relative age of the computing device based on the extracted signal; (v) selecting a service from a plurality of services based on the estimated relative age of the computing device; and (vi) providing the selected service to the computing device.

At least one aspect is directed to a system to serve content based on latency signals. The system can include a data processing system having one or more processors and memory. The data processing system can receive data from a computing device via a connection established between the data processing system and the computing device. The data processing system can extract a signal from the data received from the computing device. The signal can indicate information relating to latency of performance of the computing device in response to a query or a command. The data processing system can identify, based on a lookup in a database with the signal, an estimated date of manufacture of the computing device. The data processing system can detect a configuration of the computing device. The data processing system can select, based on the configuration of the computing device and the estimated date of manufacture of the computing device, a service to provide to the computing device. The data processing system can provide, to the computing device, the service to cause the computing device to execute the service.

At least one aspect is directed to a method of serving content based on latency signals. The method can include a data processing system receiving data from a computing device via a connection established between the data processing system and the computing device. The method can include the data processing system extracting a signal from the data received from the computing device. The signal can indicate information relating to latency of performance of the computing device in response to a query or a command. The method can include the data processing system identifying, based on a lookup in a database with the signal, an estimated date of manufacture of the computing device. The method can include the data processing system detecting a configuration of the computing device. The method can include the data processing system selecting, based on the configuration of the computing device and the estimated date of manufacture of the computing device, a service to provide to the computing device. The method can include the data processing system providing, to the computing device, the service to cause the computing device to execute the service.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings:

FIG. 2 is block diagram of an environment for providing services according to various implementations of the disclosure.

DETAILED DESCRIPTION

Various implementations relate to systems and methods for determining a relative age of a computing device based on characteristics and patterns in transmitted identifiers sent by the computing device to a server (e.g., internet content server). Accordingly, services may be provided to the computing device based on the relative age of the computing device. In particular implementations the systems and methods identify new computing devices connecting to the Internet for one of the first few times time to provide such computing devices with services, such as (but not limited to) content providing, appropriate for new computing devices.

Figure 1A:
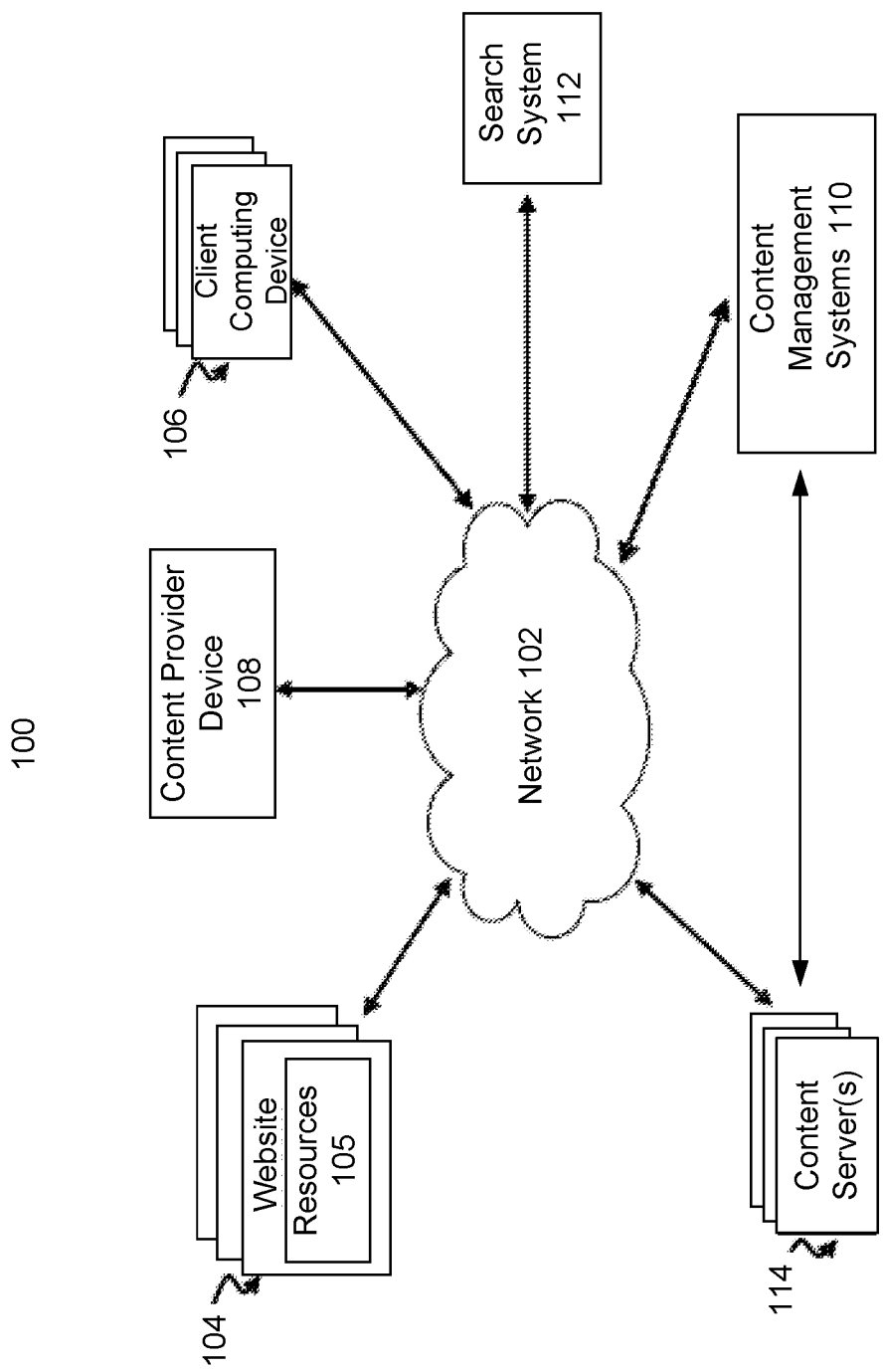
FIG. 1A is a block diagram of an environment in which a digital content management system manages content services according to various implementations of the disclosure.

FIG. 1A is a block diagram of an environment in which a content management system manages content-providing services. The environment 100 includes a network 102, such as a local area network (LAN), a wide area network (WAN), the Internet, or a combination thereof. The network 102 connects websites 104, client computing devices 106, content provider devices 108, and a content management system 110. The environment 100 may include many thousands of websites 104, client computing devices 106, and content provider devices 108.

The website 104 is one or more resources 105 associated with a domain name and hosted by one or more servers. For instance, a website may be a collection of web pages formatted in hypertext markup language (HTML) that can contain text, images, multimedia content, and programming elements, such as scripts.

The resource 105 is any data that can be provided over the network 102. The resource 105 is identified by a resource address that is associated with the resource 105, such as a uniform resource locator (URL). The resource 105 may include web pages, word processing documents, portable document format (PDF) documents, images, video, programming elements, interactive content, feed sources, and/or any other type of content. The resource 105 can include content, such as words, phrases, images, and sounds, which may include embedded information (such as meta-information in hyperlinks) and/or embedded instructions (such as JavaScript™ scripts).

The client computing device 106 is an electronic device that is controllable by a user and is capable of requesting and receiving resources (e.g., 105) over the network 102. Client computing devices 106 may include, but are not limited to, personal computers, mobile communication devices, and other devices that can send and receive data over the network 102. The client computing device 106 typically includes a user application, such as a web browser, to facilitate the sending and receiving of data over the network 102. The client computing device 106 may also be referred to as a computing device.

The client computing device 106 can request the resources 105 from the website 104. In turn, data representing the resource 105 can be provided to the client computing device 106 for presentation by the client computing device 106. The data representing the resource 105 can include data specifying a portion of the resource 105 or a portion of a user display (e.g., a presentation location of a pop-up window or in a slot of a web page) in which content or other sponsored content can be presented. These specified portions of the resource 105 or user display are referred to as content slots. In some implementations, "content" may refer to a content item or digital content item. In such implementations, for instance, "content provider" may refer to a provider of the content.

To facilitate searching of the vast number of resources 105 accessible over the network 102, the environment 100 can include a search system 112 that identifies the resources 105 by crawling and indexing the resources provided on the websites 104. Data about the resources can be indexed based on the resource with which the data is associated. The indexed and, optionally, cached copies of the resources are stored in a search index (not shown).

The client computing device 106 can submit search queries to the search system 112 over the network 102. In response, the search system 112 accesses the search index to identify resources that are relevant to the search query. In some implementations, a search query includes one or more keywords. The search system 112 identifies the relevant resources 105 in the form of search results and returns the search results to the client computing device 106 in search results pages. A search result is data generated by the search system 112 that identifies the resources 105 that are responsive to a particular search query, and includes a link to the resource 105. For instance, a search result can include a web page title, a snippet of text or a portion of an image extracted from the web page, a rendering of the resource, and the URL of the web page. Search results pages can also include one or more content slots in which content can be presented.

A search result page can be sent with a request from the search system 112 for the web browser of the client computing device 106 to set an HTTP (HyperText Transfer Protocol) cookie. A cookie can represent, for example, a particular client computing device 106 and a particular web browser. For example, the search system 112 includes a server that replies to the query by sending the search results page in an HTTP response. This HTTP response includes instructions (e.g., a set cookie instruction) that cause the browser to store a cookie for the site hosted by the server or for the domain of the server. If the browser supports cookies and cookies are enabled, every subsequent page request to the same server or a server within the domain of the server will include the cookie. The cookie can store a variety of data, including a unique or semi-unique identifier. The unique or semi-unique identifiers are anonymized and are not connected with user names. Because HTTP is a stateless protocol, the use of cookies allows an external service, such as the search system 112 or other system, to follow particular actions and status of a user over multiple sessions. A user may, at any time, opt out of allowing user actions to be followed, for example, by disabling cookies in the browser's settings. According to various implementations, the search system 112 does not follow user identifying information. In some implementations, a user may be required to opt in to enable user actions to be followed.

When a resource 105 or search results are requested by the client computing device 106, the content management system 110 receives a request for content to be provided with the resource 105 or search results. The request for content can include characteristics of the content slots that are defined for the requested resource or search results page and can be provided to the content management system 110. For example, a reference (e.g., URL) to the resource 105 for which the content slot is defined, a size of the content slot, a position of the content slot within the resources, and/or media types that are available for presentation in the content slot can be provided to the content management system 110. Similarly, keywords (i.e., one or more words that are associated with content) associated with a requested resource ("resource keywords") or a search query for which search results are requested can also be provided to the content management system 110 to facilitate identification of content that are relevant to the resource 105 or search query.

Using data included in the request for content, the content management system 110 can select content that are eligible to be provided in response to the request ("eligible content" or "candidate content"). For example, eligible content can include content having characteristics matching the characteristics of content slots and that are identified as relevant to specified resource keywords or search queries. In some implementations, content having keywords that match the resource keywords or the search query are selected as eligible content by the content management system 110.

The content management system 110 selects an eligible content for each content slot of a resource 105 or of a search results page. The resource 105 or search results page is received by the client computing device 106 for presentation to the user. In some implementations, the selected content is delivered to the client computing device 106 via one or more content servers 114.

The content provider devices 108 can submit, to the content management system 110, campaign parameters (e.g., matching keywords and corresponding bids) that are used to control distribution of content. The content provider devices 108 can access the content management system 110 to monitor performance of the content that are distributed using the campaign parameters. For example, a content provider can access a campaign performance report that provides a number of impressions (i.e., presentations), selections (i.e., clicks), and conversions that have been identified for the content.

The campaign performance report can also provide a total cost, a cost-per-click, and other cost measures for the content over a specified period. For example, a content provider may access a performance report that specifies that content distributed using the phrase match keyword "hockey" have received 1,000 impressions (i.e., have been presented 1,000 times), have been selected (e.g., clicked) 20 times, and have been credited with 5 conversions. Thus, the phrase match keyword "hockey" can be attributed with 1,000 impressions, 20 clicks, and 5 conversions.

One example of online content offers pay-per-click (PPC) content providing, cost-per-thousand (CPM) content providing, and site-specific content providing for text, banner, and rich-media content. The program includes local, national, and international distribution. The text content can be short, generally comprising one headline of 25 characters and two additional text lines of 35 characters each. Image content can be one of several different Interactive Advertising Bureau (IAB) standard sizes.

In some implementations in which the content campaign comprises a PPC content, content providers select the words that should trigger their content and the maximum amount they will pay per click. When a user searches on a search engine, content for relevant words appear as "sponsored links" on the (right or left) side of the page, and sometimes above or below the main search results. In some implementations, content can appear on any portion of a page. The ordering of the paid-for listings can depend on other content providers' bids (PPC) and factors such as the "quality score" of all content shown for a given search. In some implementations, the content management system 110 determines the factors based on historical click-through rates, predicted click-through rates, relevance of a content provider's content text and keywords, a content provider's account history, and other relevance factors. The quality score can be also used to set the minimum bids for a content provider's keywords. The minimum bid takes into consideration the quality of the landing page as well, which includes the relevancy and originality of content, navigability, and transparency into the nature of the business.

In some implementations, a "user" may refer to any company, organization, partnership, individual, agent, or entity that is involved in online content providing. Thus, in some implementations "user" and "content provider" can be used interchangeable. Keyword coverage refers to the number of searches done by "search engine users" that result in a paid result—content—being displayed. For example, 50% of searches conducted on a search engine may result in a paid content being displayed. Out of that, 1% of the searches may result in a specific content provider's URL being provided. In general, the online content provider's goal is to have its content appear on a display page after as many relevant searches as possible. One way a content provider can extend their keyword coverage is by purchasing additional keywords, thus increasing the likelihood that their content will appear on displays of search results. The number of paid results per keyword can vary, and where a URL ranks among the paid results can depend on several factors, including relevancy and the keyword purchase price.

There are several ways a content provider selects keywords to purchase. For example, a content provider can select a group of keywords that define the products, services, or content it offers on its web page. A content provider may try to expand its keyword selection by selecting all synonyms, or by selecting keywords that are related, in some manner, to the products, services or content it offers on its web page. A content provider may try to optimize its selection of keywords by monitoring how effective each keyword is. For example, the content provider may use a tool that records the number of times a purchased keyword is entered into a search engine and the number of times that results in their web page being viewed.

Figure 1B:
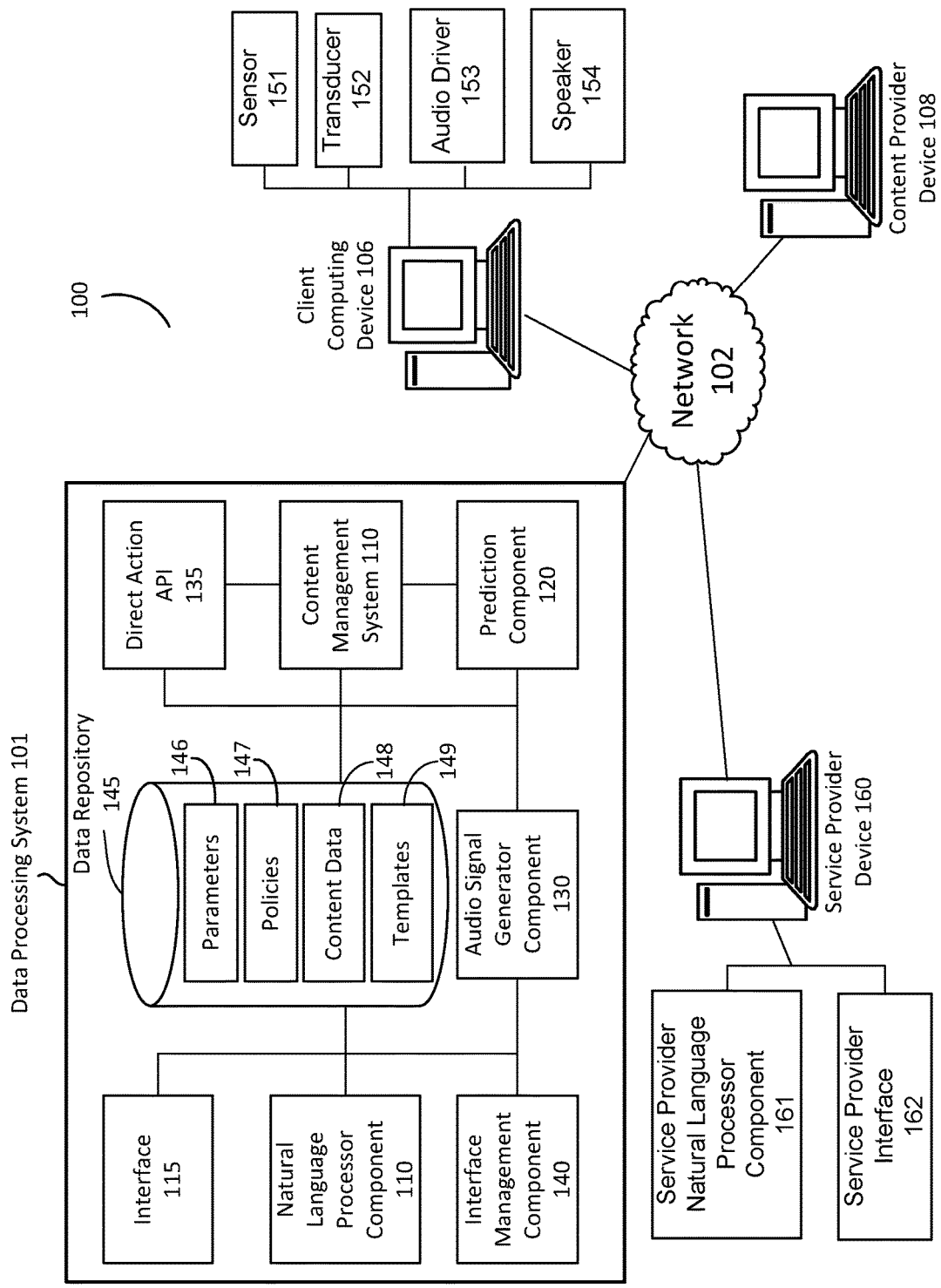
FIG. 1B depicts a system to of multi-modal transmission of packetized data in a voice activated computer network environment.

FIG. 1B depicts an example system 100 to for multi-modal transmission of packetized data in a voice activated data packet (or other protocol) based computer network environment. The system 100 can include at least one data processing system 101. The data processing system 101 can include at least one server having at least one processor. For example, the data processing system 101 can include a plurality of servers located in at least one data center or server farm. The data processing system 101 can determine, from an audio input signal a request and a trigger keyword associated with the request. Based on the request and trigger keyword the data processing system 101 can determine or select at least one action data structure, and can select at least one content item (and initiate other actions as described herein). The data processing system 101 can identify candidate interfaces for rendering of the action data structures or the content items, and can provide the action data structures or the content items for rendering by one or more candidate interfaces on one or more client computing devices based on resource utilization values for or of the candidate interfaces, for example as part of a voice activated communication or planning system. The action data structures (or the content items) can include one or more audio files that when rendered provide an audio output or acoustic wave. The action data structures or the content items can include other content (e.g., text, video, or image content) in addition to audio content.

The data processing system 101 can include multiple, logically-grouped servers and facilitate distributed computing techniques. The logical group of servers may be referred to as a data center, server farm or a machine farm. The servers can be geographically dispersed. A data center or machine farm may be administered as a single entity, or the machine farm can include a plurality of machine farms. The servers within each machine farm can be heterogeneous—one or more of the servers or machines can operate according to one or more type of operating system platform. The data processing system 101 can include servers in a data center that are stored in one or more high-density rack systems, along with associated storage systems, located for example in an enterprise data center. The data processing system 101 with consolidated servers in this way can improve system manageability, data security, the physical security of the system, and system performance by locating servers and high performance storage systems on localized high performance networks. Centralization of all or some of the data processing system 101 components, including servers and storage systems, and coupling them with advanced system management tools allows more efficient use of server resources, which saves power and processing requirements and reduces bandwidth usage.

The data processing system 101 can include at least one natural language processor (NLP) component 164, at least one interface 115, at least one prediction component 120, at least one content management system 110, at least one audio signal generator component 130, at least one direct action application programming interface (API) 135, at least one interface management component 140, and at least one data repository 145. The NLP component 164, interface 115, prediction component 120, content management system 110, audio signal generator component 130, direct action API 135, and interface management component 140 can each include at least one processing unit, server, virtual server, circuit, engine, agent, appliance, or other logic device such as programmable logic arrays configured to communicate with the data repository 145 and with other computing devices (e.g., at least one client computing device 106, at least one content provider computing device 108, or at least one service provider computing device 160) via the at least one computer network 102. The network 102 can include computer networks such as the internet, local, wide, metro or other area networks, intranets, satellite networks, other computer networks such as voice or data mobile phone communication networks, and combinations thereof.

The network 102 can include or constitute a display network, e.g., a subset of information resources available on the internet that are associated with a content placement or search engine results system, or that are eligible to include third party content items as part of a content item placement campaign. The network 102 can be used by the data processing system 101 to access information resources such as web pages, web sites, domain names, or uniform resource locators that can be presented, output, rendered, or displayed by the client computing device 106. For example, via the network 102 a user of the client computing device 106 can access information or data provided by the data processing system 101, the content provider computing device 108 or the service provider computing device 160.

The network 102 can include, for example a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network or a wireline network, and combinations thereof. The network 102 can include a wireless link, such as an infrared channel or satellite band. The topology of the network 102 may include a bus, star, or ring network topology. The network 102 can include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The client computing device 106, the content provider computing device 108, and the service provider computing device 160 can each include at least one logic device such as a computing device having a processor to communicate with each other or with the data processing system 101 via the network 102. The client computing device 106, the content provider computing device 108, and the service provider computing device 160 can each include at least one server, processor or memory, or a plurality of computation resources or servers located in at least one data center. The client computing device 106, the content provider computing device 108, and the service provider computing device 160 can each include at least one computing device such as a desktop computer, laptop, tablet, personal digital assistant, smartphone, portable computer, server, thin client computer, virtual server, or other computing device.

The client computing device 106 can include at least one sensor 151, at least one transducer 152, at least one audio driver 153, and at least one speaker 154. The sensor 151 can include a microphone or audio input sensor. The transducer 152 can convert the audio input into an electronic signal, or vice-versa. The audio driver 153 can include a script or program executed by one or more processors of the client computing device 106 to control the sensor 151, the transducer 152 or the audio driver 153, among other components of the client computing device 106 to process audio input or provide audio output. The speaker 154 can transmit the audio output signal.

The client computing device 106 can be associated with an end user that enters voice queries as audio input into the client computing device 106 (via the sensor 151) and receives audio output in the form of a computer generated voice that can be provided from the data processing system 101 (or the content provider computing device 108 or the service provider computing device 160) to the client computing device 106, output from the speaker 154. The audio output can correspond to an action data structure received from the direct action API 135, or a content item selected by the content management system 110. The computer generated voice can include recordings from a real person or computer generated language.

The content provider computing device 108 (or the data processing system 101 or service provider computing device 160) can provide audio based content items or action data structures for display by the client computing device 106 as an audio output. The action data structure or content item can include an organic response or offer for a good or service, such as a voice based message that states: "Today it will be sunny and 80 degrees at the beach" as an organic response to a voice-input query of "Is today a beach day?". The data processing system 101 (or other system 100 component such as the content provider computing device 108 can also provide a content item as a response, such as a voice or text message based content item offering sunscreen.

The content provider computing device 108 or the data repository 145 can include memory to store a series of audio action data structures or content items that can be provided in response to a voice based query. The action data structures and content items can include packet based data structures for transmission via the network 102. The content provider computing device 108 can also provide audio or text based content items (or other content items) to the data processing system 101 where they can be stored in the data repository 145. The data processing system 101 can select the audio action data structures or text based content items and provide (or instruct the content provider computing device 108 to provide) them to the same or different client computing devices 106 responsive to a query received from one of those client computing device 106. The audio based action data structures can be exclusively audio or can be combined with text, image, or video data. The content items can be exclusively text or can be combined with audio, image or video data.

The service provider computing device 160 can include at least one service provider natural language processor (NLP) component 161 and at least one service provider interface 162. The service provider NLP component 161 (or other components such as a direct action API of the service provider computing device 160) can engage with the client computing device 106 (via the data processing system 101 or bypassing the data processing system 101) to create a back-and-forth real-time voice or audio based conversation (e.g., a session) between the client computing device 106 and the service provider computing device 160. For example, the service provider interface 162 can receive or provide data messages (e.g., action data structures or content items) to the direct action API 135 of the data processing system 101. The direct action API 135 can also generate the action data structures independent from or without input from the service provider computing device 160. The service provider computing device 160 and the content provider computing device 108 can be associated with the same entity. For example, the content provider computing device 108 can create, store, or make available content items for beach relates services, such as sunscreen, beach towels or bathing suits, and the service provider computing device 160 can establish a session with the client computing device 106 to respond to a voice input query about the weather at the beach, directions for a beach, or a recommendation for an area beach, and can provide these content items to the end user of the client computing device 106 via an interface of the same client computing device 106 from which the query was received, a different interface of the same client computing device 106, or an interface of a different client computing device. The data processing system 101, via the direct action API 135, the NLP component 164 or other components can also establish the session with the client computing device, including or bypassing the service provider computing device 160, to for example to provide an organic response to a query related to the beach.

The data repository 145 can include one or more local or distributed databases, and can include a database management system. The data repository 145 can include computer data storage or memory and can store one or more parameters 146, one or more policies 147, content data 148, or templates 149 among other data. The parameters 146, policies 147, and templates 149 can include information such as rules about a voice based session between the client computing device 106 and the data processing system 101 (or the service provider computing device 160). The content data 148 can include content items for audio output or associated metadata, as well as input audio messages that can be part of one or more communication sessions with the client computing device 106.

The system 100 can optimize processing of action data structures and content items in a voice activated data packet (or other protocol) environment. For example, the data processing system 101 can include or be part of a voice activated assistant service, voice command device, intelligent personal assistant, knowledge navigator, event planning, or other assistant program. The data processing system 101 can provide one or more instances of action data structures as audio output for display from the client computing device 106 to accomplish tasks related to an input audio signal. For example, the data processing system can communicate with the service provider computing device 160 or other third party computing devices to generate action data structures with information about a beach, among other things. For example, an end user can enter an input audio signal into the client computing device 106 of: "OK, I would like to go to the beach this weekend" and an action data structure can indicate the weekend weather forecast for area beaches, such as "it will be sunny and 80 degrees at the beach on Saturday, with high tide at 3 pm."

The action data structures can include a number of organic or non-sponsored responses to the input audio signal. For example, the action data structures can include a beach weather forecast or directions to a beach. The action data structures in this example include organic, or non-sponsored content that is directly responsive to the input audio signal. The content items responsive to the input audio signal can include sponsored or non-organic content, such as an offer to buy sunscreen from a convenience store located near the beach. In this example, the organic action data structure (beach forecast) is responsive to the input audio signal (a query related to the beach), and the content item (a reminder or offer for sunscreen) is also responsive to the same input audio signal. The data processing system 101 can evaluate system 100 parameters (e.g., power usage, available displays, formats of displays, memory requirements, bandwidth usage, power capacity or time of input power (e.g., internal battery or external power source such as a power source from a wall output) to provide the action data structure and the content item to different candidate interfaces on the same client computing device 106, or to different candidate interfaces on different client computing devices 106.

The data processing system 101 can include an application, script or program installed at the client computing device 106, such as an app to communicate input audio signals (e.g., as data packets via a packetized or other protocol based transmission) to at least one interface 115 of the data processing system 101 and to drive components of the client computing device 106 to render output audio signals (e.g., for action data structures) or other output signals (e.g., content items). The data processing system 101 can receive data packets or other signal that includes or identifies an audio input signal. For example, the data processing system 101 can execute or run the NLP component 164 to receive the audio input signal.

The NLP component 164 can convert the audio input signal into recognized text by comparing the input signal against a stored, representative set of audio waveforms (e.g., in the data repository 145) and choosing the closest matches. The representative waveforms are generated across a large set of users, and can be augmented with speech samples. After the audio signal is converted into recognized text, the NLP component 164 can match the text to words that are associated, for example via training across users or through manual specification, with actions that the data processing system 101 can serve.

The audio input signal can be detected by the sensor 151 (e.g., a microphone) of the client computing device. Via the transducer 152, the audio driver 153, or other components the client computing device 106 can provide the audio input signal to the data processing system 101 (e.g., via the network 102) where it can be received (e.g., by the interface 115) and provided to the NLP component 164 or stored in the data repository 145 as content data 148.

The NLP component 164 can receive or otherwise obtain the input audio signal. From the input audio signal, the NLP component 164 can identify at least one request or at least one trigger keyword corresponding to the request. The request can indicate intent or subject matter of the input audio signal. The trigger keyword can indicate a type of action likely to be taken. For example, the NLP component 164 can parse the input audio signal to identify at least one request to go to the beach for the weekend. The trigger keyword can include at least one word, phrase, root or partial word, or derivative indicating an action to be taken. For example, the trigger keyword "go" or "to go to" from the input audio signal can indicate a need for transport or a trip away from home. In this example, the input audio signal (or the identified request) does not directly express an intent for transport, however the trigger keyword indicates that transport is an ancillary action to at least one other action that is indicated by the request.

The prediction component 120 (or other mechanism of the data processing system 101) can generate, based on the request or the trigger keyword, at least one action data structure associated with the input audio signal. The action data structure can indicate information related to subject matter of the input audio signal. The action data structure can include one or more than one action, such as organic responses to the input audio signal. For example, the input audio signal "OK, I would like to go to the beach this weekend" can include at least one request indicating an interest for a beach weather forecast, surf report, or water temperature information, and at least one trigger keyword, e.g., "go" indicating travel to the beach, such as a need for items one may want to bring to the beach, or a need for transportation to the beach. The prediction component 120 can generate or identify subject matter for at least one action data structure, an indication of a request for a beach weather forecast, as well as subject matter for a content item, such as an indication of a query for sponsored content related to spending a day at a beach. From the request or the trigger keyword the prediction component 120 (or other system 100 component such as the NLP component 164 or the direct action API 135) predicts, estimates, or otherwise determines subject matter for action data structures or for content items. From this subject matter, the direct action API 135 can generate at least one action data structure and can communicate with at least one content provider computing device 108 to obtain at least one content item 108. The prediction component 120 can access the parameters 146 or policies 147 in the data repository 145 to determine or otherwise estimate requests for action data structures or content items. For example, the parameters 146 or policies 147 could indicate requests for a beach weekend weather forecast action or for content items related to beach visits, such as a content item for sunscreen.

The content management system 110 can obtain indications of any of the interest in or request for the action data structure or for the content item. For example, the prediction component 120 can directly or indirectly (e.g., via the data repository 145) provide an indication of the action data structure or content item to the content management system 110. The content management system 110 can obtain this information from the data repository 145, where it can be stored as part of the content data 148. The indication of the action data structure can inform the content management system 110 of a need for area beach information, such as a weather forecast or products or services the end user may need for a trip to the beach.

From the information received by the content management system 110, e.g., an indication of a forthcoming trip to the beach, the content management system 110 can identify at least one content item. The content item can be responsive or related to the subject matter of the input audio query. For example, the content item can include data message identifying as tore near the beach that has sunscreen, or offering a taxi ride to the beach. The content management system 110 can query the data repository 145 to select or otherwise identify the content item, e.g., from the content data 148. The content management system 110 can also select the content item from the content provider computing device 108. For example responsive to a query received from the data processing system 101, the content provider computing device 108 can provide a content item to the data processing system 101 (or component thereof) for eventual output by the client computing device 106 that originated the input audio signal, or for output to the same end user by a different client computing device 106.

The audio signal generator component 130 can generate or otherwise obtain an output signal that includes the content item (as well as the action data structure) responsive to the input audio signal. For example, the data processing system 101 can execute the audio signal generator component 130 to generate or create an output signal corresponding to the action data structure or to the content item. The interface component 115 of the data processing system 101 can provide or transmit one or more data packets that include the output signal via the computer network 102 to any client computing device 106. The interface 115 can be designed, configured, constructed, or operational to receive and transmit information using, for example, data packets. The interface 115 can receive and transmit information using one or more protocols, such as a network protocol. The interface 115 can include a hardware interface, software interface, wired interface, or wireless interface. The interface 115 can facilitate translating or formatting data from one format to another format. For example, the interface 115 can include an application programming interface that includes definitions for communicating between various components, such as software components of the system 100.

The data processing system 101 can provide the output signal including the action data structure from the data repository 145 or from the audio signal generator component 130 to the client computing device 106. The data processing system 101 can provide the output signal including the content item from the data repository 145 or from the audio signal generator component 130 to the same or to a different client computing device 106.

The data processing system 101 can also instruct, via data packet transmissions, the content provider computing device 108 or the service provider computing device 160 to provide the output signal (e.g., corresponding to the action data structure or to the content item) to the client computing device 106. The output signal can be obtained, generated, transformed to or transmitted as one or more data packets (or other communications protocol) from the data processing system 101 (or other computing device) to the client computing device 106.

The content management system 110 can select the content item or the action data structure for the as part of a real-time content selection process. For example, the action data structure can be provided to the client computing device 106 for transmission as audio output by an interface of the client computing device 106 in a conversational manner in direct response to the input audio signal. The real-time content selection process to identify the action data structure and provide the content item to the client computing device 106 can occur within one minute or less from the time of the input audio signal and be considered real-time. The data processing system 101 can also identify and provide the content item to at least one interface of the client computing device 106 that originated the input audio signal, or to a different client computing device 106.

The action data structure (or the content item), for example obtained or generated by the audio signal generator component 130 transmitted via the interface 115 and the computer network 102 to the client computing device 106, can cause the client computing device 106 to execute the audio driver 153 to drive the speaker 154 to generate an acoustic wave corresponding to the action data structure or to the content item. The acoustic wave can include words of or corresponding to the action data structure or content item.

The acoustic wave representing the action data structure can be output from the client computing device 106 separately from the content item. For example, the acoustic wave can include the audio output of "Today it will be sunny and 80 degrees at the beach." In this example, the data processing system 101 obtains the input audio signal of, for example, "OK, I would like to go to the beach this weekend." From this information the NLP component 164 identifies at least one request or at least one trigger keyword, and the prediction component 120 uses the request(s) or trigger keyword(s) to identify a request for an action data structure or for a content item. The content management system 110 (or other component) can identify, select, or generate a content item for, e.g., sunscreen available near the beach. The direct action API 135 (or other component) can identify, select, or generate an action data structure for, e.g., the weekend beach forecast. The data processing system 101 or component thereof such as the audio signal generator component 130 can provide the action data structure for output by an interface of the client computing device 106. For example, the acoustic wave corresponding to the action data structure can be output from the client computing device 106. The data processing system 101 can provide the content item for output by a different interface of the same client computing device 106 or by an interface of a different client computing device 106.

The packet based data transmission of the action data structure by data processing system 101 to the client computing device 106 can include a direct or real-time response to the input audio signal of "OK, I would like to go to the beach this weekend" so that the packet based data transmissions via the computer network 102 that are part of a communication session between the data processing system 101 and the client computing device 106 with the flow and feel of a real-time person to person conversation. This packet based data transmission communication session can also include the content provider computing device 108 or the service provider computing device 160.

The content management system 110 can select the content item or action data structure based on at least one request or at least one trigger keyword of the input audio signal. For example, the requests of the input audio signal "OK, I would like to go to the beach this weekend" can indicate subject matter of the beach, travel to the beach, or items to facilitate a trip to the beach. The NLP component 164 or the prediction component 120 (or other data processing system 101 components executing as part of the direct action API 135) can identify the trigger keyword "go" "go to" or "to go to" and can determine a transportation request to the beach based at least in part on the trigger keyword. The NLP component 164 (or other system 100 component) can also determine a solicitation for content items related to beach activity, such as for sunscreen or beach umbrellas. Thus, the data processing system 101 can infer actions from the input audio signal that are secondary requests (e.g., a request for sunscreen) that are not the primary request or subject of the input audio signal (information about the beach this weekend).

The action data structures and content items can correspond to subject matter of the input audio signal. The direct action API 135 can execute programs or scripts, for example from the NLP component 164, the prediction component 120, or the content management system 110 to identify action data structures or content items for one or more of these actions. The direct action API 135 can execute a specified action to satisfy the end user's intention, as determined by the data processing system 101. Depending on the action specified in its inputs, the direct action API 135 can execute code or a dialog script that identifies the parameters required to fulfill a user request. Such code can lookup additional information, e.g., in the data repository 145, such as the name of a home automation service, or it can provide audio output for rendering at the client computing device 106 to ask the end user questions such as the intended destination of a requested taxi. The direct action API 135 can determine necessary parameters and can package the information into an action data structure, which can then be sent to another component such as the content management system 110 or to the service provider computing device 160 to be fulfilled.

The direct action API 135 of the data processing system 101 can generate, based on the request or the trigger keyword, the action data structures. The action data structures can be generated responsive to the subject matter of the input audio signal. The action data structures can be included in the messages that are transmitted to or received by the service provider computing device 160. Based on the audio input signal parsed by the NLP component 164, the direct action API 135 can determine to which, if any, of a plurality of service provider computing devices 160 the message should be sent. For example, if an input audio signal includes "OK, I would like to go to the beach this weekend," the NLP component 164 can parse the input audio signal to identify requests or trigger keywords such as the trigger keyword word "to go to" as an indication of a need for a taxi. The direct action API 135 can package the request into an action data structure for transmission as a message to a service provider computing device 160 of a taxi service. The message can also be passed to the content management system 110. The action data structure can include information for completing the request. In this example, the information can include a pick up location (e.g., home) and a destination location (e.g., a beach). The direct action API 135 can retrieve a template 149 from the data repository 145 to determine which fields to include in the action data structure. The direct action API 135 can retrieve content from the data repository 145 to obtain information for the fields of the data structure. The direct action API 135 can populate the fields from the template with that information to generate the data structure. The direct action API 135 can also populate the fields with data from the input audio signal. The templates 149 can be standardized for categories of service providers or can be standardized for specific service providers. For example, ride sharing service providers can use the following standardized template 149 to create the data structure: {client_device_identifier; authentication_credentials; pick_up_location; destination_location; no_passengers; service_level}.

The content management system 110 can identify, select, or obtain multiple content items resulting from a multiple content selection processes. The content selection processes can be real-time, e.g., part of the same conversation, communication session, or series of communications sessions between the data processing system 101 and the client computing device 106 that involve common subject matter. The conversation can include asynchronous communications separated from one another by a period of hours or days, for example. The conversation or communication session can last for a time period from receipt of the first input audio signal until an estimated or known conclusion of a final action related to the first input audio signal, or receipt by the data processing system 101 of an indication of a termination or expiration of the conversation. For example, the data processing system 101 can determine that a conversation related to a weekend beach trip begins at the time or receipt of the input audio signal and expires or terminates at the end of the weekend, e.g., Sunday night or Monday morning. The data processing system 101 that provides action data structures or content items for rendering by one or more interfaces of the client computing device 106 or of another client computing device 106 during the active time period of the conversation (e.g., from receipt of the input audio signal until a determined expiration time) can be considered to be operating in real-time. In this example the content selection processes and rendering of the content items and action data structures occurs in real time.

The interface management component 140 can poll, determine, identify, or select interfaces for rendering of the action data structures and of the content items related to the input audio signal. For example, the interface management component 140 can identify one or more candidate interfaces of client computing devices 106 associated with an end user that entered the input audio signal (e.g., "What is the weather at the beach today?") into one of the client computing devices 106 via an audio interface. The interfaces can include hardware such as sensor 151 (e.g., a microphone), speaker 154, or a screen size of a computing device, alone or combined with scripts or programs (e.g., the audio driver 153) as well as apps, computer programs, online documents (e.g., webpage) interfaces and combinations thereof.

The interfaces can include social media accounts, text message applications, or email accounts associated with an end user of the client computing device 106 that originated the input audio signal. Interfaces can include the audio output of a smartphone, or an app based messaging device installed on the smartphone, or on a wearable computing device, among other client computing devices 106. The interfaces can also include display screen parameters (e.g., size, resolution), audio parameters, mobile device parameters, (e.g., processing power, battery life, existence of installed apps or programs, or sensor 151 or speaker 154 capabilities), content slots on online documents for text, image, or video renderings of content items, chat applications, laptops parameters, smartwatch or other wearable device parameters (e.g., indications of their display or processing capabilities), or virtual reality headset parameters.

The interface management component 140 can poll a plurality of interfaces to identify candidate interfaces. Candidate interfaces include interfaces having the capability to render a response to the input audio signal, (e.g., the action data structure as an audio output, or the content item that can be output in various formats including non-audio formats). The interface management component 140 can determine parameters or other capabilities of interfaces to determine that they are (or are not) candidate interfaces. For example, the interface management component 140 can determine, based on parameters 146 of the content item or of a first client computing device 106 (e.g., a smartwatch wearable device), that the smartwatch includes an available visual interface of sufficient size or resolution to render the content item. The interface management component 140 can also determine that the client computing device 106 that originated the input audio signal has a speaker 154 hardware and installed program e.g., an audio driver or other script to render the action data structure.

The interface management component 140 can determine utilization values for candidate interfaces. The utilization values can indicate that a candidate interface can (or cannot) render the action data structures or the content items provided in response to input audio signals. The utilization values can include parameters 146 obtained from the data repository 145 or other parameters obtained from the client computing device 106, such as bandwidth or processing utilizations or requirements, processing power, power requirements, battery status, memory utilization or capabilities, or other interface parameters that indicate the available of an interface to render action data structures or content items. The battery status can indicate a type of power source (e.g., internal battery or external power source such as via an output), a charging status (e.g., currently charging or not), or an amount of remaining battery power. The interface management component 140 can select interfaces based on the battery status or charging status.

The interface management component 140 can order the candidate interfaces in a hierarchy or ranking based on the utilization values. For example different utilization values (e.g., processing requirements, display screen size, accessibility to the end user) can be given different weights. The interface management component 140 can rank one or more of the utilization values of the candidate interfaces based on their weights to determine an optimal corresponding candidate interface for rendering of the content item (or action data structure). Based on this hierarchy, the interface management component 140 can select the highest ranked interface for rendering of the content item.

Based on utilization values for candidate interfaces, the interface management component 140 can select at least one candidate interface as a selected interface for the content item. The selected interface for the content item can be the same interface from which the input audio signal was received (e.g., an audio interface of the client computing device 106) or a different interface (e.g., a text message based app of the same client computing device 106, or an email account accessible from the same client computing device 106.

The interface management component 140 can select an interface for the content item that is an interface of a different client computing device 106 than the device that originated the input audio signal. For example, the data processing system 101 can receive the input audio signal from a first client computing device 106 (e.g., a smartphone), and can select an interface such as a display of a smartwatch (or any other client computing device for rendering of the content item. The multiple client computing devices 106 can all be associated with the same end user. The data processing system 101 can determine that multiple client computing devices 106 are associated with the same end user based on information received with consent from the end user such as user access to a common social media or email account across multiple client computing devices 106.

The interface management component 140 can also determine that an interface is unavailable. For example the interface management component 140 can poll interfaces and determine that a battery status of a client computing device 106 associated with the interface is low, or below a threshold level such as 10%. Or the interface management component 140 can determine that the client computing device 106 associated with the interface lacks sufficient display screen size or processing power to render the content item, or that the processor utilization rate is too high, as the client computing device is currently executing another application, for example to stream content via the network 102. In these and other examples the interface management component 140 can determine that the interface is unavailable and can eliminate the interface as a candidate for rendering the content item or the action data structure.

Thus, the interface management component 140 can determine that a candidate interface accessible by the first client computing device 106 is linked to an account of an end user, and that a second candidate interface accessible by a second client computing device 106 is also linked to the same account. For example, both client computing devices 106 may have access to the same social media account, e.g., via installation of an app or script at each client computing device 106. The interface management component 140 can also determine that multiple interfaces correspond to the same account, and can provide multiple, different content items to the multiple interfaces corresponding to the common account. For example, the data processing system 101 can determine, with end user consent, that an end user has accessed an account from different client computing devices 106. These multiple interfaces can be separate instances of the same interface (e.g., the same app installed on different client computing devices 106) or different interfaces such as different apps for different social media accounts that are both linked to a common email address account, accessible from multiple client computing devices 106.

The interface management component 140 can also determine or estimate distances between client computing devices 106 associated with candidate interfaces. For example, the data processing system 101 can obtain, with user consent, an indication that the input audio signal originated from a smartphone or virtual reality headset computing device 106, and that the end user is associated with an active smartwatch client computing device 106. From this information the interface management component can determine that the smartwatch is active, e.g., being worn by the end user when the end user enters the input audio signal into the smartphone, so that the two client computing devices 106 are within a threshold distance of one another. In another example, the data processing system 101 can determine, with end user consent, the location of a smartphone that is the source of an input audio signal, and can also determine that a laptop account associated with the end user is currently active. For example, the laptop can be signed into a social media account indicating that the user is currently active on the laptop. In this example the data processing system 101 can determine that the end user is within a threshold distance of the smartphone and of the laptop, so that the laptop can be an appropriate choice for rendering of the content item via a candidate interface.

The interface management component 140 can select the interface for the content item based on at least one utilization value indicating that the selected interface is the most efficient for the content item. For example, from among candidate interfaces, the interface to render the content item at the smartwatch uses the least bandwidth due as the content item is smaller and can be transmitted with fewer resources. Or the interface management component 140 can determine that the candidate interface selected for rendering of the content item is currently charging (e.g., plugged in) so that rendering of the content item by the interface will not drain battery power of the corresponding client computing device 106. In another example, the interface management component 140 can select a candidate interface that is currently performing fewer processing operations than another, unselected interface of for example a different client computing device 106 that is currently streaming video content from the network 102 and therefore less available to render the content item without delay.

The interface management component 140 (or other data processing system 101 component) can convert the content item for delivery in a modality compatible with the candidate interface. For example, if the candidate interface is a display of a smartwatch, smartphone, or tablet computing device, the interface management component 140 can size the content item for appropriate visual display given the dimensions of the display screen associated with the interface. The interface management component 140 can also convert the content item to a packet or other protocol based format, including proprietary or industry standard format for transmission to the client computing device 106 associated with the selected interface. The interface selected by the interface management component 140 for the content item can include an interface accessible from multiple client computing devices 106 by the end user. For example, the interface can be or include a social media account that the end user can access via the client computing device 106 that originated the input audio signal (e.g., a smartphone) as well as other client computing devices such as tabled or desktop computers or other mobile computing devices.

The interface management component 140 can also select at least one candidate interface for the action data structure. This interface can be the same interface from which the input audio signal was obtained, e.g., a voice activated assistant service executed at a client computing device 106. This can be the same interface or a different interface than the interface management component 140 selects for the content item. The interface management component 140 (or other data processing system 101 components) can provide the action data structure to the same client computing device 106 that originated the input audio signal for rendering as audio output as part of the assistant service. The interface management component 140 can also transmit or otherwise provide the content item to the selected interface for the content item, in any converted modality appropriate for rendering by the selected interface.

Thus, the interface management component 140 can provide the action data structure as audio output for rendering by an interface of the client computing device 106 responsive to the input audio signal received by the same client computing device 106. The interface management component 140 can also provide the content item for rendering by a different interface of the same client computing device 106 or of a different client computing device 106 associated with the same end user. For example, the action data structure, e.g., "it will be sunny and 80 degrees at the beach on Saturday" can be provided for audio rendering by the client computing device as part of an assistant program interface executing in part at the client computing device 106, and the content item e.g., a text, audio, or combination content item indicating that "sunscreen is available from the convenience store near the beach" can be provided for rendering by an interface of the same or a different computing device 106, such as an email or text message accessible by the same or a different client computing device 106 associated with the end user.

Separating the content item from the action data structure and sending the content item as, for example, a text message rather than an audio message can result in reduced processing power for the client computing device 106 that accesses the content item since, for example, text message data transmissions are less computationally intensive than audio message data transmissions. This separation can also reduce power usage, memory storage, or transmission bandwidth used to render the content item. This results in increased processing, power, and bandwidth efficiencies of the system 100 and devices such as the client computing devices 106 and the data processing system 101. This increases the efficiency of the computing devices that process these transactions, and increases the speed with which the content items can be rendered. The data processing system 101 can process thousands, tens of thousands or more input audio signals simultaneously so the bandwidth, power, and processing savings can be significant and not merely incremental or incidental.

The interface management component 140 can provide or deliver the content item to the same client computing device 106 (or a different device) as the action data structure subsequent to delivery of the action data structure to the client computing device 106. For example, the content item can be provided for rendering via the selected interface upon conclusion of audio output rendering of the action data structure. The interface management component 140 can also provide the content item to the selected interface concurrent with the provision of the action data structure to the client computing device 106. The interface management component 140 can provide the content item for delivery via the selected interface within a pre-determined time period from receipt of the input audio signal by the NLP component 164. The time period, for example, can be any time during an active length of the conversation of session. For example, if the input audio signal is "I would like to go to the beach this weekend" the pre-determined time period can be any time from receipt of the input audio signal through the end of the weekend, e.g., the active period of the conversation. The pre-determined time period can also be a time triggered from rendering of the action data structure as audio output by the client computing device 106, such as within 5 minutes, one hour or one day of this rendering.

The interface management component 140 can provide the action data structure to the client computing device 106 with an indication of the existence of the content item. For example, the data processing system 101 can provide the action data structure that renders at the client computing device 106 to provide the audio output "it will be sunny and 80 degrees at the beach on Saturday, check your email for more information." The phrase "check your email for more information" can indicate the existence of a content item, e.g., for sunscreen, provided by the data processing system 101 to an interface (e.g., email). In this example, sponsored content can be provided as content items to the email (or other) interface and organic content such as the weather can be provided as the action data structure for audio output.

The data processing system 101 can also provide the action data structure with a prompt that queries the user to determine user interest in obtaining the content item. For example, the action data structure can indicate "it will be sunny and 80 degrees at the beach on Saturday, would you like to hear about some services to assist with your trip?" The data processing system 101 can receive another audio input signal from the client computing device 106 in response to the prompt "would you like to hear about some services to assist with your trip?" such as "sure". The NLP component 164 can parse this response, e.g., "sure" and interpret it as authorization for audio rendering of the content item by the client computing device 106. In response, the data processing system 101 can provide the content item for audio rendering by the same client computing device 106 from which the response "sure" originated.

The data processing system 101 can delay transmission of the content item associated with the action data structure to optimize processing utilization. For example, the data processing system 101 provide the action data structure for rendering as audio output by the client computing device in real-time responsive to receipt of the input audio signal, e.g., in a conversational manner, and can delay content item transmission until an off-peak or non-peak period of data center usage, which results in more efficient utilization of the data center by reducing peak bandwidth usage, heat output or cooling requirements. The data processing system 101 can also initiate a conversion or other activity associated with the content item, such as ordering a car service responsive to a response to the action data structure or to the content item, based on data center utilization rates or bandwidth metrics or requirements of the network 102 or of a data center that includes the data processing system 101.

Based on a response to a content item or to the action data structure for a subsequent action, such as a click on the content item rendered via the selected interface, the data processing system 101 can identify a conversion, or initiate a conversion or action. Processors of the data processing system 101 can invoke the direct action API 135 to execute scripts that facilitate the conversion action, such as to order a car from a car share service to take the end user to or from the beach. The direct action API 135 can obtain content data 148 (or parameters 146 or policies 147) from the data repository 145, as well as data received with end user consent from the client computing device 106 to determine location, time, user accounts, logistical or other information in order to reserve a car from the car share service. Using the direct action API 135, the data processing system 101 can also communicate with the service provider computing device 160 to complete the conversion by in this example making the car share pick up reservation.

FIG. 2 is a block diagram of an environment 200 for providing services. With reference to FIGS. 1 and 2, the environment 200 may correspond to the environment 100 (or a portion thereof). For instance, network 202 (e.g., Internet) may correspond to the network 102, content management system 210 may correspond to the content management system 110, search system 212 may correspond to the search system 112, content server 214 may correspond to the content server 214. Client computing devices 206a-206c (referred to collectively or individually as 206) may correspond to the client computing devices 106. The client computing device 206 may be referred to as a computing device 206. In various implementations, the environment 200 may include other components of the environment 100.

The computer device 206 may be for example, but not limited to, one or more of a desktop computer, a network computer, a midrange computer, a mainframe computer, and/or the like. In addition, the computer device 206 be for example, but not limited to, one or more of be a remote or portable computing system such as a laptop computer, a netbook computer, a tablet computer, a personal digital assistant (PDA), a cellular telephone, other wireless device, and/or the like. The computer device 206 may be a stand-alone system or part of a network environment. In other implementations, the computer device 206 may be any electronic device, such as, but not limited to, a display device, a television, a video game system, a media player, set-top box, and/or the like.

In various implementations, the computer device 206 is or includes a smart television module (or connected television module, hybrid television module, etc.), which may include a processing circuit configured to integrate internet connectivity with more traditional television programming sources (e.g., received via cable, satellite, over-the-air, or other signals). The smart television module may be physically incorporated into a television set or may include a separate device such as a set-top box, Blu-ray or other digital media player, game console, hotel television system, and other companion device.

A smart television module may be configured to allow viewers to search and find videos, movies, photos and other content on the web, on a local cable TV channel, on a satellite TV channel, or stored on a local hard drive. A set-top box (STB) or set-top unit (STU) may include an information appliance device that may contain a tuner and connect to a television set and an external source of signal, turning the signal into content that is then displayed on the television screen or other display device. A smart television module may be configured to provide a home screen or top level screen including icons for a plurality of different applications, such as a web browser and a plurality of streaming media services (e.g., Netflix, Vudu, Hulu, etc.), a connected cable or satellite media source, other web "channels", etc. The smart television module may further be configured to provide an electronic programming guide to the user.

A companion application to the smart television module may be operable on a mobile computing device to provide additional information about available programs to a user, to allow the user to control the smart television module, etc. In alternate implementations, the features may be implemented on a laptop computer or other personal computer, a smartphone, other mobile phone, handheld computer, a tablet PC, or other computing device.

In various implementations, one or more components of the environment 200 may be provided or otherwise used with on a server or group of servers. The server (or group of servers) may be an internet content server 220. For instance, the internet content server 220 may include or be used with any one or more of the content management system 210, the search system 212, and the content server 214.

In various implementations, the content server 220 is configured to estimate or otherwise determine a relative age of a computing device 206 when the computing device 206 is connected to the content server 220 over the Internet 202. In particular implementations, by estimating the relative age of the computing device 206, the content server 220 may identify if the computing device 206 is a "new" computing device (e.g., the computing device 206 is connecting to the content server 220 and/or the Internet 202 for the first time).

Figure 3:
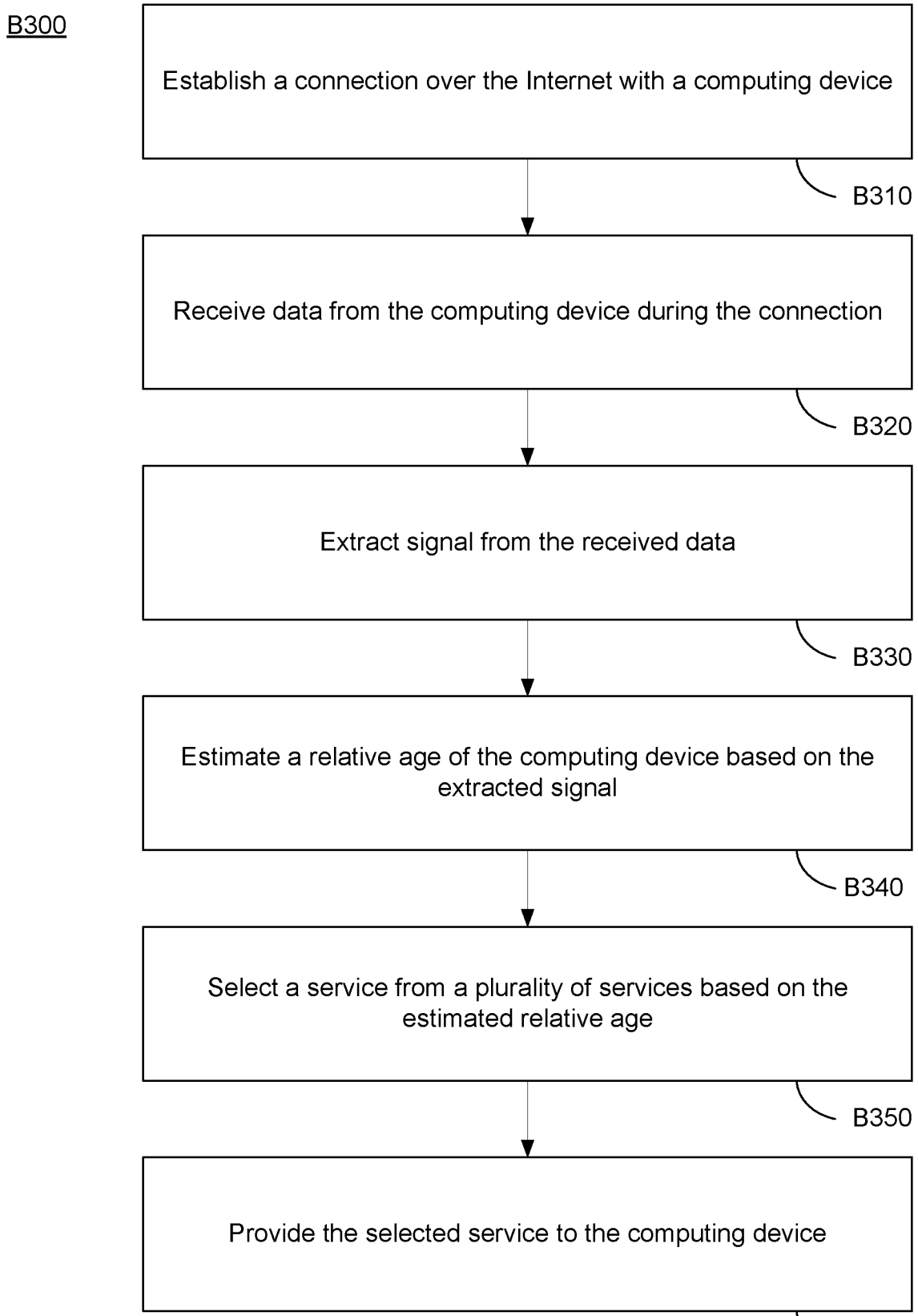
FIG. 3 illustrates a method for providing services according to various implementations of the disclosure.

FIG. 3 illustrates a method B300 that may be used to estimate a relative age of a computing device. With reference to FIGS. 1-3, at block B310, the content server 220 establishes a connection over the Internet 202 with the computing device 206. This may occur, for instance, when the computing device 206 connects with the content server 220 to access a service provided by the content server 220.

At block B320, the content server 220 receives data from the computing device 206. The data may be received at any suitable time, such as when the connection is established or at any time during the connection. For instance, in particular implementations, the data may be sent by a browser on the computing device 206 in an HTTP header or the like. In other implementations, the data may be passed through various application or device-specific protocols, protocol buffers, or any other system that involves remote procedure calls.

At block B330, the content server 220 may extract a signal from the received data. As discussed in (but not limited to) the disclosure, the signal may correspond to information relating to the computing device 206 that may be used to estimate a relative age of the computing device 206.

In some implementations, the extracted signal corresponds to a unique identifier (e.g., Media Access Control (MAC) address, serial number, etc.) assigned to the computing device 206 (or component thereof) for instance during manufacture of the computing device 206. The unique identifier may be used to estimate the relative age of the computing device 206.

At block B340, the content server 220 may use the extracted signal to estimate the relative age of the computing device.

In various implementations, the content server 220 includes a database 216 containing information (e.g., algorithms, models, catalogs, etc.) for estimating the relative age of computing device 206 based on the extracted signal of the computing device 206. For instance, if the extracted signal corresponds to a given unique identifier, such as a serial number, for the computing device 206, the given serial number (e.g., a portion thereof) may be cross-referenced with a catalog of manufacturers in the database 216 to determine the manufacturer of the computing device 206. Then, information relating to the determined manufacturer of the computing device 206 provided in the database 216 may be used with the given serial number (e.g., a remaining or portion thereof) to estimate the relative age of the computing device 206. Accordingly, for instance, the relative age of the computing device 206 may be estimated with some degree of probability to have been manufactured on a given date or date range.

In some implementations, the content server 220 analyzes the unique identifier for a pattern or characteristic. The pattern may be cross-referenced with a catalog of know patterns in the database 216 to estimate the relative age of the computing device 206.

Some or all of the information in the database 216 may be provided therein in any suitable manner, for instance by administrators or users of the database 216, by manufacturers, and/or the like. In particular implementations, the information in the database 216 is heuristic information that may allow the relative age of the computing device 206 to be estimated based on the extracted signal of the computing device 206.

As a computing device is used over time, the computing device 206 begins to accumulate a variety of usage information (e.g., installed programs, cache information, cookies, access and modification timestamps for certain files or resources, disk fragmentation statistics, flash memory write counters, temperature and motion sensing data, cookies, browser plugins, browser version, browser user-agent composition, etc.). Thus, in some implementations, some of the usage information may be represented in the signal extracted from the data received from the computing device 206 and may be a basis for estimating the relative age of the computing device 206.

In some implementations, an amount of certain information provided in the extracted signal may be used to determine the relative age of the computing device 206. For instance, a computing device 206 that is relatively new will generally have less usage information (e.g., less than a predetermined amount of usage information) than a computing device 206 that is older. In particular implementations, the predetermined amount of usage information for a given relative age for a computing device 206 may be determined heuristically (e.g., the predetermine amount is based on usage information typically found on a computing device 206 for the given relative age). Thus, for example, if the amount of usage information of the computing device 206, for instance as represented in the extracted signal, is less than the predetermined threshold (e.g., for a computing device 206 that is less than one month in use), a relative age for the computing device 206 may be estimated to be less than one month. If the amount of usage information, for instance as represented in the extracted signal, is more than the predetermined threshold, the relative age for the computing device 206 may be estimated to be more than one month.

In some implementations, a presence or absence of information provided in the extracted signal may be used to determine the relative age of the computing device 206. For instance, a computing device 206 that is relatively new will be more likely to have an absence of certain information (e.g., information representative of missing hardware, such as, a disk drive, hard disk drive, Ethernet connectors, monitor connectors, information representative of missing software or data, and/or the like) than a computing device 206 that is older. For instance, an absence of predetermined software or data (e.g., browser plug-in) that does not come pre-installed on the computing device and must be downloaded (e.g., by the user) from the Internet may suggest that the computing device 206 is relatively new, whereas a presence of such software or data may suggest that the computing device is not relatively new. In particular implementations, the certain information that is determined to be present or absent may be determined heuristically (e.g., the certain information is based on information typically found on a computing device 206 for the given relative age). Thus, for example, if the certain information of the computing device 206, for instance as represented in the extracted signal, is absent (e.g., for a computing device 206 that is less than one month in use), a relative age for the computing device 206 may be estimated to be less than one month. If the certain information, for instance as represented in the extracted signal, is present, the relative age for the computing device 206 may be estimated to be more than one month.

In some implementations, an order of information provided in the extracted signal may be used to determine the relative age of the computing device 206. For instance, a computing device 206 that is relatively new will be more likely to have a predetermined order (e.g., access and modification timestamps on a certain set up files when initially installed, web browser user agent, order of registry settings, etc.) than a computing device 206 that is older. In particular implementations, the order of the information may be determined heuristically (e.g., the order of the certain information is based on an order for such information typically found on a computing device 206 for the given relative age). Thus, for example, if the order of the certain information of the computing device 206, for instance as represented in the extracted signal, is a predetermined order (e.g., for a computing device 206 that is less than one month in use), a relative age for the computing device 206 may be estimated to be less than one month. If the order for the certain information, for instance as represented in the extracted signal, is not the predetermined order, the relative age for the computing device 206 may be estimated to be more than one month.

In some implementations, the content server 220 sends a query or command to the computing device 206. In such implementations, the extracted signal may correspond to a response or output provided in the data by the computing device 206 in response to the query or command. As such, the response or output may be used by the content server 220 to estimate a relative age of the computing device 206. For instance, if latency or performance of the computing device 206, which may be determined from the response or output, is below a specified threshold, the relative age of the computing device 206 may be estimated to be less than if the latency or performance of the computing device 206 was equal to or above the specified threshold. In particular implementations, the response or output may be used to determine information (e.g., component/manufacturer identity, firmware/software version, etc.) for estimating the relative age of the computing device 206. For instance, processor chips may have different floating point algorithms so that one chip may output a first response and another chip may output a second, different response. As such, the query may request the computing device 206 to execute a specified command such that the output to the command may be used to identify the processor chip of the computing device 206. The identity of the chip, for instance, may be used along with other information (e.g., a serial number) to estimate the relative age of the processor chip and/or the computing device 206, for instance in a manner discussed in (but not limited to) the disclosure.

At block B350, a service for providing to the computing device 206 may be selected based on the estimated relative age of the computing device 206. At block B360, the content server 220 may provide the selected service to the computing device 206.

In some implementations, the content server 220 (e.g., the content management system 110) selects an eligible content for each content slot of a website resource 105 or of a search results page based on the estimated relative age of the computing device 206. For instance, if the computing device 206 is determined to be relatively new (e.g., have a relative age of less than one month), content that may interest a user of a new computing device may be selected (e.g., content items for accessories, warranty plans, software, etc.). Also, for instance, if the computing device 206 is determined to be relatively old (e.g., have a relative age of more than two years), content that may interest a user of such a computing device may be selected (e.g., content items for new computers, hardware component upgrades, etc.). Accordingly, such implementations provide users with content that are more likely to interest them.

In some implementations, the content server 220 selects an offer for presenting to a user of the computing device 206 based on the estimated relative age of the computing device 206. For instance, if the computing device 206 is determined to be relatively new (e.g., have a relative age of less than one month), the content server 220 may select a first offer that provides a first benefit to the user. Likewise, if the computing device 206 is determined not to be relatively new (e.g., having a relative age of more than one month), the content server 220 may select a second offer that provides a second benefit to the user. In particular implementations, the offer may provide a benefit (e.g., credits, merchandise, services, products, discounts, etc.) that is contingent to the user performing a predetermined action, such as (but not limited to) configuring the user's computing device, browser, software, etc. in a predetermine manner. For instance, a user of a relatively new computing device may receive an offer for a benefit if the user changes the default search engine on the user's computing device to a predetermined search engine (e.g., google.com) or if the user changes the default browser on the user's computing device to a predetermined browser (e.g., Chrome). A user of a computing device that is not relatively new may not receive an offer as such a user is more likely to be content with his or her current configuration. In other cases, a user of a computing device that is not relatively new may receive a different offer, for instance one having a larger benefit to provide incentive to the user to perform the predetermined action.

In various implementations, the estimated relative age of the computing device is a date range (e.g., the estimated relative age is between zero and three months). In particular implementations, the estimated relative age of the computing device 206 includes a statistical probability that the estimated relative age of the computing device 206 is correct (e.g., 95% probability that a given computing device has a relative age of between zero and three months). In further implementations, the probability (along with the estimated relative age) is a basis for selecting and/or providing a service (e.g., B260 and B270).

In some implementations, the relative age of the computing device 206 refers to an amount of time since the computing device 206 has been manufactured. In some implementations, the relative age of the computing device 206 refers to an amount of time that the computing device 206 has been used (e.g., total time powered on, total time with active usage by a user, total time connected to Internet, etc.). In some implementations, the relative age of the computing device 206 refers to an amount of time since the computing device 206 was first used.

In some implementations, the relative age is estimated for the computing device 206 as a whole. In other implementations, the relative age is estimated for one or more hardware (e.g., hard drive, Ethernet card, etc.) or software (e.g., operating system, browser, etc.) components of the computing device 206.

Figure 4:
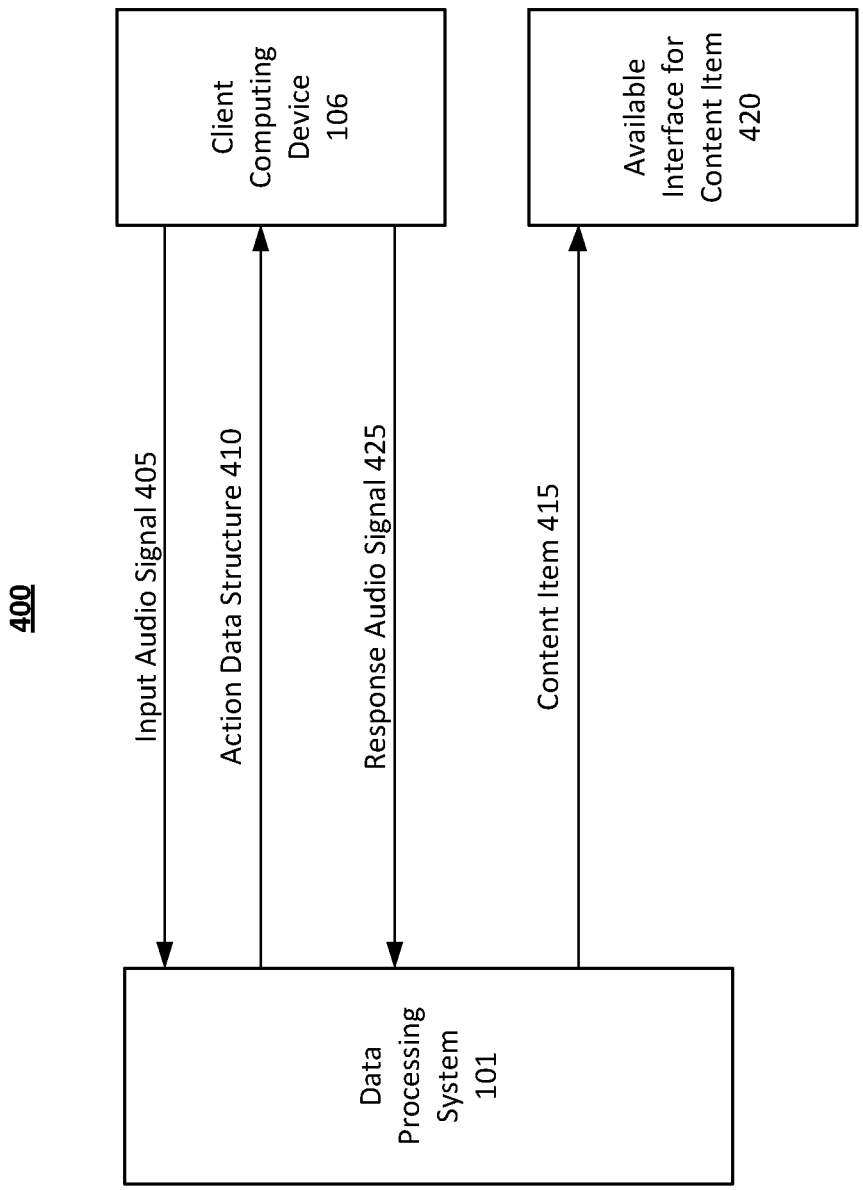
FIG. 4 depicts a flow diagram for multi-modal transmission of packetized data in a voice activated computer network environment.

FIG. 4 depicts a flow diagram 400 for multi-modal transmission of packetized data in a voice activated computer network environment. The data processing system 101 can receive the input audio signal 405, e.g., "OK, I would like to go to the beach this weekend." In response, the data processing system generates at least one action data structure 410 and at least one content item 415. The action data structure 405 can include organic or non-sponsored content, such as a response for audio rendering stating "It will be sunny and 80 degrees at the beach this weekend" or "high tide is at 3 pm." The data processing system 101 can provide the action data structure 410 to the same client computing device 106 that originated the input audio signal 405, for rendering by a candidate interface of the client computing device 106, e.g., as output in a real time or conversational manner as part of a digital or conversational assistant platform.

The data processing system 101 can select the candidate interface 420 as a selected interface for the content item 415, and can provide the content item 415 to the selected interface 420. The content item 415 can also include a data structure, converted to the appropriate modality by the data processing system 101 for rendering by the selected interface 420. The content item 415 can include sponsored content, such as an offer to rent a beach chair for the day, or for sunscreen. The selected interface 420 can be part of or executed by the same client computing device 106 or by a different device accessible by the end user of the client computing device 106. Transmission of the action data structure 410 and the content item 415 can occur at the same time or subsequent to one another. The action data structure 410 can include an indicator that the content item 415 is being or will be transmitted separately via a different modality or format to the selected interface 400, alerting the end user to the existence of the content item 415.

The action data structure 410 and the content item 415 can be provided separately for rendering to the end user. By separating the sponsored content (content item 415) from the organic response (action data structure 410) audio or other alerts indicating that the content item 415 is sponsored do not need to be provided with the action data structure 410. This can reduce bandwidth requirements associated with transmission of the action data structure 410 via the network 102 and can simplify rendering of the action data structure 410, for example without audio disclaimer or warning messages.

The data processing system 101 can receive a response audio signal 425. The response audio signal 425 can include an audio signal such as, "great, please book me a hotel on the beach this weekend." Receipt by the data processing system 101 of the response audio signal 425 can cause the data processing system to invoke the direct action API 135 to execute a conversion to, for example, book a hotel room on the beach. The direct action API 135 can also communicate with at least one service provider computing device 160 to provide information to the service provider computing device 160 so that the service provider computing device 160 can complete or confirm the booking process.

Figure 5:
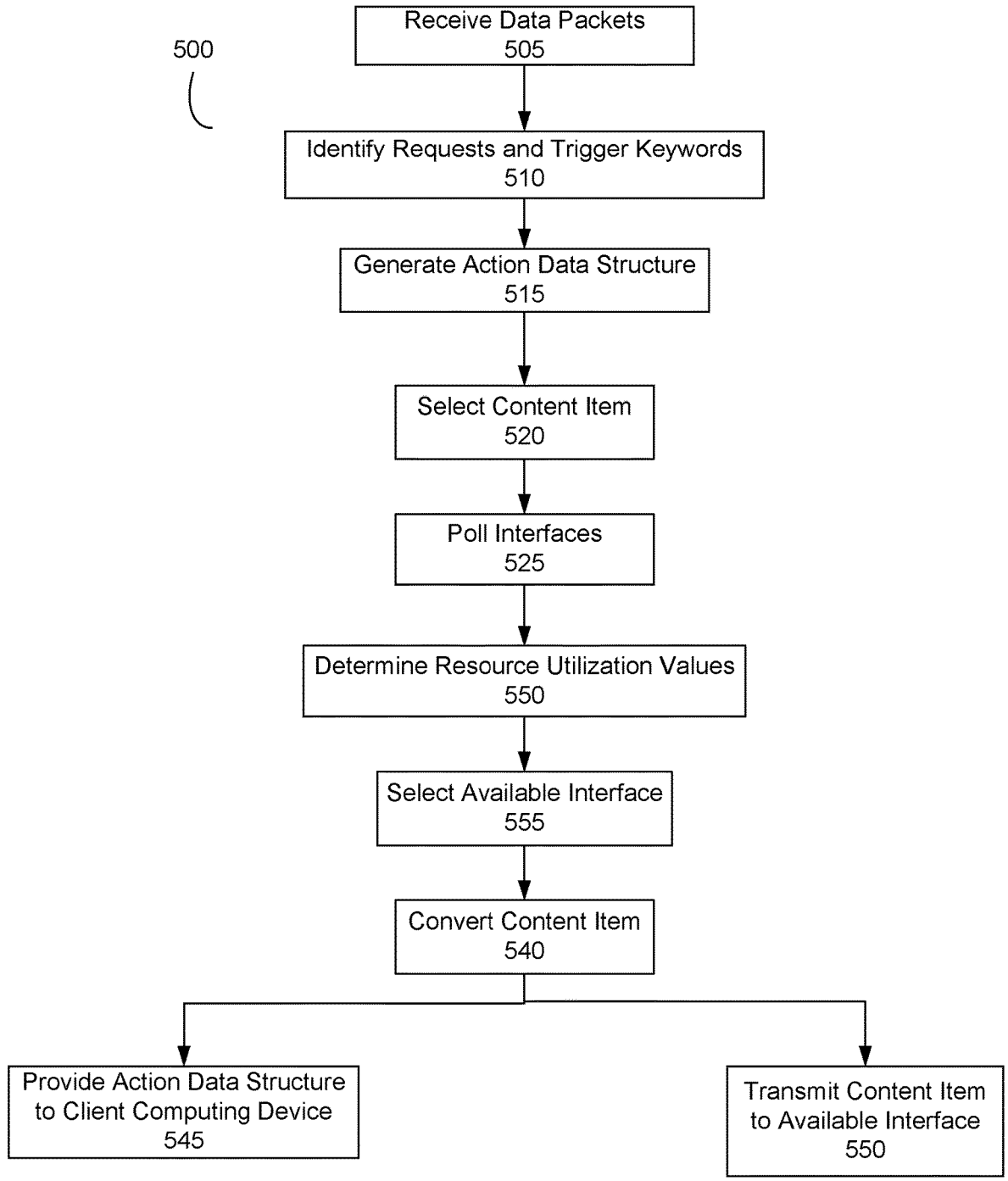
FIG. 5 depicts a method of multi-modal transmission of packetized data in a voice activated computer network environment.

FIG. 5 depicts a method 500 of multi-modal transmission of packetized data in a voice activated computer network environment. The method 500 can receive data packets (ACT 505). For example, the NLP component 164, executed by the data processing system 101, can receive from the client computing device 105 data packets that include an input audio signal (ACT 505). The data packets can be received (ACT 505) via the network 102 as packet or other protocol based data transmissions. The method 500 can identify, from the input audio signal, requests or trigger keywords corresponding to the requests (ACT 510). For example, the NLP component 164 can parse the input audio signal to identify requests that relate to subject matter of the input audio signal, or to identify trigger keywords that can indicate, for example, actions associated with the requests.

The method 500 can generate at least one action data structure (ACT 515). For example, the direct action API 135 can generate action data structures (ACT 515) based on the requests or trigger keywords. The action data structures can indicate organic or non-sponsored content related to the input audio signal. The method 500 can select at least one content item (ACT 520). For example, the content management system 110 can receive the request(s) or the trigger keyword(s) and based on this information can select one or more content items. The content items can include sponsored items having subject matter that relates to subject matter of the request or of the trigger keyword. The content items can be selected by the content management system 110 via a real-time content selection process.

The method 500 can poll a plurality of interfaces to determine at least one candidate interface (ACT 525). The candidate interfaces can include candidate interfaces for rendering of the selected content item (or action data structure). For example, the interface management component 140 can query interfaces to obtain utilization values, e.g., parameter information or other characteristics about the interfaces (ACT 530). Based on the utilization values the interface management component 140 can select (ACT 535) at least one candidate interface as a selected interface for rendering of the content item (or of the action data structure). The method 500 can include converting the content item to a modality for rendering via the selected interface (ACT 540). For example the data processing system 101 or component thereof such as the interface management component 140 can convert the content item for rendering in a content item slot of an online document (e.g., for display as an email (e.g., via a selected email interface) or as a text message for display in a chat app).

The method 500 can provide the action data structure to the client computing device 106 for rendering (ACT 545) and can transmit the content item to the candidate interface selected for rendering of the content item (ACT 550). For example, via the interface 115 the interface management component 140 can provide the action data structure to the client computing device 106 for rendering as audio output responsive to the input audio signal (ACT 545). The data processing system can also transmit the content item to the selected interface on the same or a different client computing device 106 for rendering in the converted modality (ACT 550).

Figure 6:
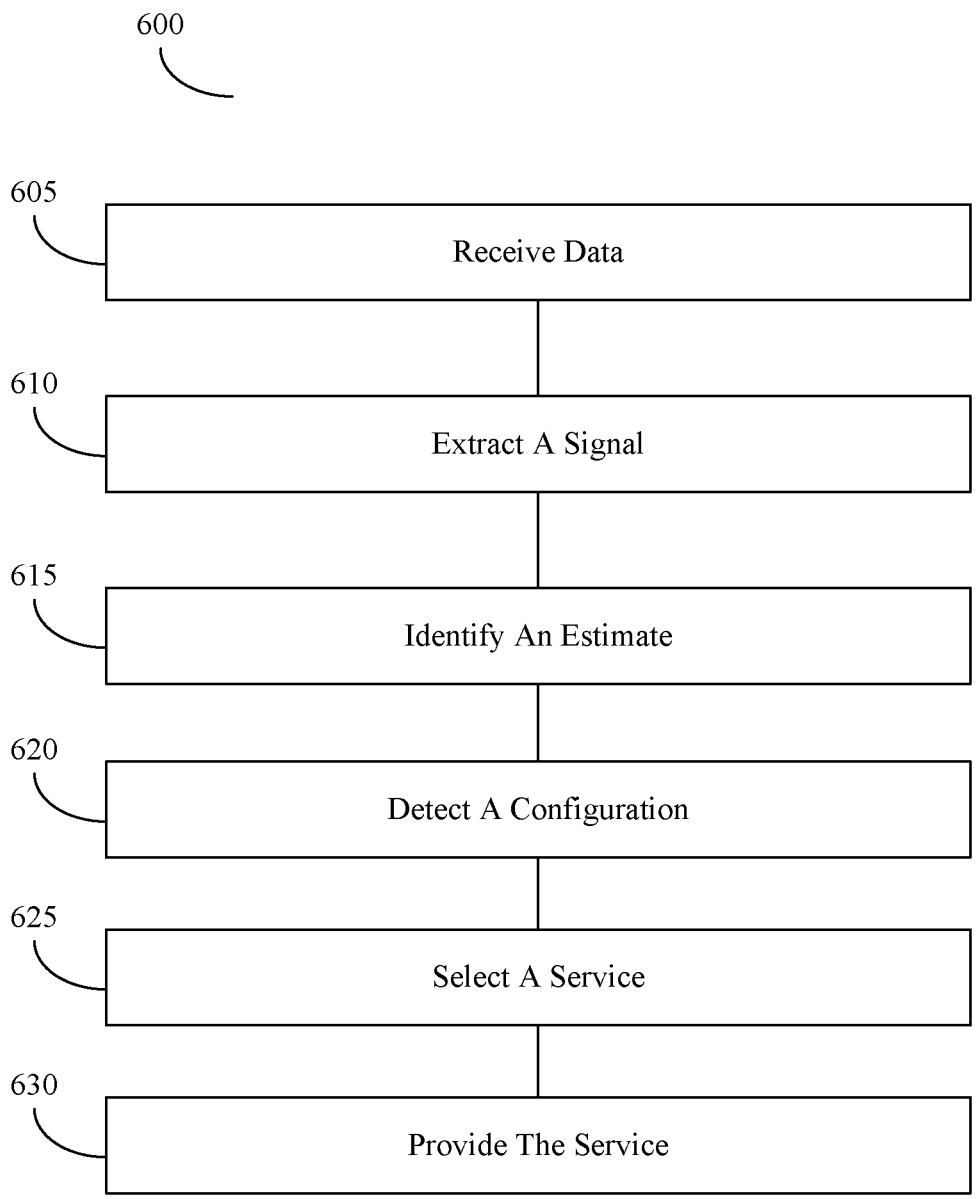
FIG. 6 depicts a method of serving content based on latency signals.

FIG. 6 depicts a method of serving content based on latency signals. The method 600 can be performed by one or more system or component depicted in FIG. 1A, FIG. 1B, FIG. 2, or FIG. 4. For example, the method 600 can be performed by one or more of a data processing system 101, client computing device 106, content server 114, content management systems 110, content management systems 110, or direction action API 135. The method 600 can include processes or functions depicted in FIG. 3.

At ACT 605, the data processing system can receive data. The data processing system can receive data from a computing device via a connection established between the processor and the computing device. The data processing system can receive the data via a network. The data can be received responsive to network activity, a request, a query, or polling. The data can include information about the computing device, including, for example, an identifier associated with the computing device, configuration of the computing device, version of the computing device, make and model of the computing device, or age of the computing device.

The data can be received at any suitable time, such as when the connection is established or at any time during the connection. For example, the data can be sent by a browser on the computing device in an HTTP header. The data can be passed through various application or device-specific protocols, protocol buffers, or any other system that involves remote procedure calls.

At ACT 610, the data processing system can extract a signal. The data processing system can extract a signal from the data received from the computing device. The signal can indicate information relating to latency of performance of the computing device in response to a query or a command. The signal can correspond to information relating to the computing device that can be used to estimate a relative age of the computing device. The extracted signal can correspond to a unique identifier (e.g., Media Access Control (MAC) address, serial number, etc.) assigned to the computing device (or component thereof), for example during manufacture of the computing device. The unique identifier may be used to estimate the relative age of the computing device. For example, a signal that indicates a device that is old can indicate that the device performs operations, tasks, or communications slower than a device that is new. The signal can indicate a resource utilization value associated with the device, such as processor utilization, memory utilization, network bandwidth utilization, battery status, or an interface parameter. A resource utilization value can indicate the percentage of the resource that is available, a resource capacity of the computing device, or an amount of the resource being utilized. Thus, an operation, task, transfer of data or communication can be latent, delayed or slower on the old device as compared to the new device based on the resource utilization value.

At ACT 615, the data processing system identified an estimate. The data processing system can identify, based on a lookup in a database with the signal, an estimated date of manufacture of the computing device. For example, the data processing system can include a database containing information (e.g., algorithms, models, catalogs, etc.) for estimating the relative age of computing device based on the extracted signal of the computing device. For example, if the extracted signal corresponds to a given unique identifier, such as a serial number, for the computing device, the given serial number (e.g., a portion thereof) may be cross-referenced with a catalog of manufacturers in the database to determine the manufacturer of the computing device. Then, information relating to the determined manufacturer of the computing device provided in the database may be used with the given serial number (e.g., a remaining or portion thereof) to estimate the relative age of the computing device. The relative age of the computing device can be estimated with some degree of probability to have been manufactured on a given date or date range.

At ACT 620, the data processing system detects a configuration. The data processing system can detect a configuration of the computing device. The configuration can include, for example, a default configuration, an application, an application version, setting, or device functionality. For example, the default configuration of the computing device can include a default search engine for the computing device or a default browser for the computing device. The configuration can indicate an application or functionality such as a device having a microphone, speaker, type of network connectivity, processor, digital assistant, or natural language processing capability. The data processing system can detect that the computing device is configured with a digital assistant, executes a digital assistant, or has an interface associated with a digital assistant. In some cases, the data processing system can detect that the computing device comprises a digital assistant.

At ACT 625, the data processing system selects a service. The data processing system can select the service based on the configuration of the computing device and the estimated date of manufacture. The data processing system can provide the selected service (ACT 630) to the computing device. The data processing system can select the service based on the latency of performance of the computing device indicated by the signal. The service can be selected based on the estimated relative age of the computing device.

The data processing system can select a service such as a content item. For example, if the computing device is determined to be relatively new (e.g., have a relative age of less than one month), content that may interest a user of a new computing device may be selected (e.g., ads for accessories, warranty plans, software, etc.). If the computing device is determined to be relatively old (e.g., have a relative age of more than two years), content that may interest a user of such a computing device may be selected (e.g., ads for new computers, hardware component upgrades, etc.). Accordingly, such implementations provide users with content that are more likely to interest them.

The data processing system can select a service based on the age and configuration of the computing device. The service can include, for example, software packages, service package, credits, merchandise, services, products, or discounts that are selected based on a predetermined action or a configuration of the computing device, browser, software, etc. in a predetermined manner. For example, a user of a relatively new computing device may receive service if the user changes the default search engine on the user's computing device to a predetermined search engine or if the user changes the default browser on the user's computing device to a predetermined browser. A user of a computing device that is not relatively new may not receive an offer as such a user is more likely to be content with his or her current configuration. A computing device that is not relatively new may receive a different offer, for instance one having a larger benefit to provide incentive to the user to perform the predetermined action.

The data processing system can select a service based on the age and configuration of the computing device. The service can include, for example, software packages, service package, credits, merchandise, services, products, or discounts that are selected based on a predetermined action or a configuration of the computing device, browser, software, etc. in a predetermined manner. For example, a user of a relatively old computing device may receive a service or content item that is configured to perform with less latency as compared to a service or content item that may use greater computational or processor resources that might cause latency of performance on the old device. The data processing system can select the higher resource consuming service for delivery to a newer computing device that can perform such operations without causing latency of performance.

At ACT 640, the data processing system provides the service. The data processing system can provide the service to cause the computing device to execute the service. The data processing system can provide the service including a content item, audio content, audio output, an action data structure, video content, image content, executable script, or configuration setting.

The data processing system can identify multiple computing devices or surfaces associated with an account, and select a computing device to provide a service to. For example, the data processing system can poll a plurality of computing devices. The data processing system can extract a first signal received from the first computing device, and a second signal received from the second computing device. The data processing system can determine, based on the first signal and the second signal, that a first latency of performance of the first computing device is less than a second latency of performance of the second computing device. The data processing system can select, based on the determination, the first computing device for the service. The data processing system provide, responsive to the selection of the first computing, the service to the first computing device to cause the computing device to execute the service.

The data processing system can determine a first resource utilization value for the first computing device and a second resource utilization value for the second candidate interface. The first resource utilization value and the second resource utilization value based on at least one of a battery status, processor utilization, memory utilization, an interface parameter, and network bandwidth utilization. The data processing system can select, based on a comparison of the first resource utilization value and the second resource utilization value, the first computing device for the service. For example, the data processing system can select the first computing device if it has greater capacity or availability of the resource (e.g., using less of a resource).

The data processing system can identify multiple interfaces associated with one or more computing devices associated with an account of a user. The data processing system can determine a first resource utilization value for the first interface and a second resource utilization value for the second interface. The data processing system can select, based on a comparison of the first resource utilization value and the second resource utilization value, the first interface as a selected interface for the service. The data processing system can provide the service for presentation via the selected interface of the computing device.

The data processing system can convert the service for delivery in a modality compatible with the first computing device selected based on the comparison of the first resource utilization value and the second resource utilization value.

It is understood that the specific order or hierarchy of steps in the processes disclosed is an example of illustrative approaches. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the implementations disclosed herein may be implemented as electronic hardware, computer software embodied on a tangible medium, or combinations of both. To clearly illustrate this interchangeability of hardware and software, various illustrative components, blocks, modules, circuits, and steps have been described above generally in terms of their functionality. Whether such functionality is implemented as hardware or software embodied on a tangible medium depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the implementations disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more illustrative implementations, the functions described may be implemented in hardware, software or firmware embodied on a tangible medium, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk, and Blu-Ray disc where disks usually reproduce data magnetically, while discs reproduce data optically with lasers. Combinations of the above should also be included within the scope of computer-readable media.

The previous description of the disclosed implementations is provided to enable any person skilled in the art to make or use the present disclosure. Various modifications to these implementations will be readily apparent to those skilled in the art, and the generic principles defined herein may be applied to other implementations without departing from the spirit or scope of the disclosure. Thus, the present disclosure is not intended to be limited to the implementations shown herein but is to be accorded the widest scope consistent with the principles and novel features disclosed herein.

What is claimed is:

1. A system to serve content based on latency signals, comprising:
    a data processing system having one or more processors and memory to:
    receive data from a computing device via a connection established between the data processing system and the computing device;
    extract a signal from the data received from the computing device, the signal indicating information relating to latency of performance of the computing device in response to a query or a command;
    identify, based on a lookup in a database with the signal, an estimated date of manufacture of the computing device;
    detect a configuration of the computing device;
    select, based on the configuration of the computing device and the estimated date of manufacture of the computing device, a service to provide to the computing device; and
    provide, to the computing device, the service.

2. The system of claim 1, comprising the data processing system to:
    select the service based on the latency of performance of the computing device indicated by the signal.

3. The system of claim 1, comprising the data processing system to:
    detect the configuration of the computing device comprising a digital assistant.

4. The system of claim 1, wherein the computing device is a first computing device, and the signal is a first signal, the system comprising the data processing system to:
    poll a plurality of computing devices comprising the first computing device and a second computing device;
    extract the first signal received from the first computing device, and a second signal received from the second computing device;
    determine, based on the first signal and the second signal, that a first latency of performance of the first computing device is less than a second latency of performance of the second computing device;
    select, based on the determination, the first computing device for the service; and
    provide, responsive to the selection of the first computing, the service to the first computing device to cause the computing device to execute the service.

5. The system of claim 1, wherein the computing device is a first computing device, and the signal is a first signal, the system comprising the data processing system to:
- poll a plurality of computing devices comprising the first computing device and a second computing device;
- extract the first signal received from the first computing device, and a second signal received from the second computing device;
- determine a first resource utilization value for the first computing device and a second resource utilization value for the second computing device, the first resource utilization value and the second resource utilization value based on at least one of a battery status, processor utilization, memory utilization, an interface parameter, and network bandwidth utilization; and
- select, based on a comparison of the first resource utilization value and the second resource utilization value, the first computing device for the service.

6. The system of claim 5, comprising the data processing system to:
- convert the service for delivery in a modality compatible with the first computing device selected based on the comparison of the first resource utilization value and the second resource utilization value.

7. The system of claim 1, comprising the data processing system to:
- provide, to the computing device, the service including audio output.

8. The system of claim 1, comprising the data processing system to:
- receive data packets comprising an input audio signal detected by a sensor of the computing device;
- parse the input audio signal to identify a request and a trigger keyword corresponding to the request;
- generate, based on at least one of the request and the trigger keyword, an action data structure; and
- provide the action data structure to the computing device for rendering as audio output from the computing device.

9. The system of claim 1, comprising the data processing system to:
- cause the computing device to change a default configuration of the computing device based on the service.

10. The system of claim 1, wherein the computing device comprises a first interface and a second interface, the system comprising the data processing system to:
- determine a first resource utilization value for the first interface and a second resource utilization value for the second interface;
- select, based on a comparison of the first resource utilization value and the second resource utilization value, the first interface as a selected interface for the service; and
- provide the service for presentation via the selected interface of the computing device.

11. A method of serving content based on latency signals, comprising:
- receiving, by a data processing system including one or more processors, data from a computing device via a connection established between the data processing system and the computing device;
- extracting, by the data processing system, a signal from the data received from the computing device, the signal indicating information relating to latency of performance of the computing device in response to a query or a command;
- identifying, by the data processing system based on a lookup in a database with the signal, an estimated date of manufacture of the computing device;
- detecting, by the data processing system, a configuration of the computing device;
- selecting, by the data processing system, based on the configuration of the computing device and the estimated date of manufacture of the computing device, a service to provide to the computing device; and
- providing, by the data processing system to the computing device, the service.

12. The method of claim 11, comprising:
- selecting the service based on the latency of performance of the computing device indicated by the signal.

13. The method of claim 11, comprising:
- detecting the configuration of the computing device comprising a digital assistant.

14. The method of claim 11, wherein the computing device is a first computing device, and the signal is a first signal, the method comprising:
- polling a plurality of computing devices comprising the first computing device and a second computing device;
- extracting the first signal received from the first computing device, and a second signal received from the second computing device;
- determining, based on the first signal and the second signal, that a first latency of performance of the first computing device is less than a second latency of performance of the second computing device;
- selecting, based on the determination, the first computing device for the service; and
- providing, responsive to the selection of the first computing, the service to the first computing device.

15. The method of claim 11, wherein the computing device is a first computing device, and the signal is a first signal, the method comprising:
- polling a plurality of computing devices comprising the first computing device and a second computing device;
- extracting the first signal received from the first computing device, and a second signal received from the second computing device;
- determining a first resource utilization value for the first computing device and a second resource utilization value for the second computing device, the first resource utilization value and the second resource utilization value based on at least one of a battery status, processor utilization, memory utilization, an interface parameter, and network bandwidth utilization; and
- selecting, based on a comparison of the first resource utilization value and the second resource utilization value, the first computing device for the service.

16. The method of claim 15, comprising the data processing system to:
- converting the service for delivery in a modality compatible with the first computing device selected based on the comparison of the first resource utilization value and the second resource utilization value.

17. The method of claim 11, comprising:
- provide, to the computing device, the service including audio output.

18. The method of claim 11, comprising:
- receiving data packets comprising an input audio signal detected by a sensor of the computing device;
- parsing the input audio signal to identify a request and a trigger keyword corresponding to the request;

generating, based on at least one of the request and the trigger keyword, an action data structure; and providing the action data structure to the computing device for rendering as audio output from the computing device.

19. The method of claim 11, comprising:

changing a default configuration of the computing device based on the service.

20. The method of claim 11, wherein the computing device comprises a first interface and a second interface, the method comprising:

determining a first resource utilization value for the first interface and a second resource utilization value for the second interface;

selecting, based on a comparison of the first resource utilization value and the second resource utilization value, the first interface as a selected interface for the service; and providing the service for presentation via the selected interface of the computing device.

* * * * *